United States Patent
Oizumi et al.

(10) Patent No.: US 10,805,054 B2
(45) Date of Patent: *Oct. 13, 2020

(54) TERMINAL DEVICE, BASE STATION DEVICE, AND TRANSMISSION/RECEPTION METHOD

(71) Applicant: Sun Patent Trust, New York, NY (US)

(72) Inventors: Toru Oizumi, Kanagawa (JP); Ayako Horiuchi, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,536

(22) Filed: Jul. 16, 2019

(65) Prior Publication Data

US 2019/0342056 A1 Nov. 7, 2019

Related U.S. Application Data

(63) Continuation of application No. 15/807,270, filed on Nov. 8, 2017, now Pat. No. 10,404,439, which is a (Continued)

(30) Foreign Application Priority Data

Aug. 10, 2011 (JP) .................................. 2011-174888

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS 9,425,942 B2 * 8/2016 Oizumi ................. H04L 5/0007
9,843,432 B2 * 12/2017 Oizumi ................. H04L 1/1861
(Continued)

FOREIGN PATENT DOCUMENTS

JP 2010-521942 A 6/2010

OTHER PUBLICATIONS

3GPP TS 36.211 V10.1.0, "3rd Generation Partnership Project; Technical Specification Group Radio Access Network; Evolved Universal Terrestrial Radio Access (E-UTRA); Physical Channels And Modulation (Release 10)," Mar. 2011, 103 pages.
(Continued)

*Primary Examiner* — Kouroush Mohebbi
(74) *Attorney, Agent, or Firm* — Seed IP Law Group LLP

(57) ABSTRACT

In the present disclosure, even if different UL-DL configurations are set for a plurality of unit bands, notification timing of error detection results for SCell is not dispersed complicatedly, and the processing relating to the error detection results can be simplified. At the reference notification timing of a response signal with respect to downlink data of a second unit band, if a sub-frame of the second unit band is an uplink communication sub-frame and a sub-frame of a first unit band is a downlink communication sub-frame, a control unit transmits the response signal with respect to the downlink data in a specific uplink communication sub-frame (for example, #2 or #7) set in the first unit band.

14 Claims, 20 Drawing Sheets

Related U.S. Application Data continuation of application No. 15/212,081, filed on Jul. 15, 2016, now Pat. No. 9,843,432, which is a continuation of application No. 14/122,068, filed as application No. PCT/JP2012/004787 on Jul. 27, 2012, now Pat. No. 9,425,942.

(51) Int. Cl.
*H04W 72/12* (2009.01)
*H04L 27/26* (2006.01)

(52) U.S. Cl.
CPC ....... *H04L 5/0007* (2013.01); *H04W 72/1268* (2013.01); *H04L 27/2601* (2013.01)

(56) References Cited

U.S. PATENT DOCUMENTS

| | | | | |
|---|---|---|---|---|
| 10,404,439 | B2* | 9/2019 | Oizumi | H04L 1/1854 |
| 2009/0241004 | A1* | 9/2009 | Ahn | H04L 5/0055 |
| | | | | 714/749 |
| 2010/0281326 | A1 | 11/2010 | Ahn et al. | |
| 2012/0093073 | A1* | 4/2012 | Lunttila | H04L 1/1607 |
| | | | | 370/328 |
| 2012/0113925 | A1 | 5/2012 | Ahn et al. | |
| 2012/0294207 | A1 | 11/2012 | Ahn et al. | |
| 2013/0194983 | A1 | 8/2013 | Ahn et al. | |

OTHER PUBLICATIONS

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.

3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.

CATT, "HARQ and Cross-carrier Scheduling for Different TDD Configurations," R2-112798, 3GPP TSG RAN WG2 Meeting #74, Agenda Item: 7.1.2, Barcelona, Spain, May 9-13, 2011, 3 pages.

Ericsson, ST-Ericsson, "A/N transmission in the uplink for carrier aggregation," R1-100909, 3GPP TSG-RAN WG1 #60, Agneda Item: 7.1.6, San Francisco, USA, Feb. 22-26, 2010, 4 pages.

Intel Corporation, "Support of Mixed Inter-Band TDD Configurations in Re1-11 CA," R2-113216, 3GPP TSG RAN2#74 meeting, Agenda Item: 7.1.2, Barcelona, Spain, May 9-13, 2011, 3 pages.

International Search Report dated Aug. 21, 2012, for corresponding International Application No. PCT/JP2012/004787, 3 pages. [With English Translation].

Nakao et al., "Performance enhancement of E-UTRA uplink control channel in fast fading environments," IEEE 69th Vehicular Technology Conference, VTC Spring, Barcelona, Spain, Apr. 26-29, 2009, 5 pages.

Nokia Siemens Networks, Nokia Corporation, "Cell specific TDD configuration with inter-band CA," R2-112946, 3GPP TSG-RAN WG2 Meeting #74, Agenda Item: 7.1.2, Barcelona, Spain, May 9-13, 2011, 4 pages.

Nokia Siemens, Nokia, "A/N feedback for TDD with PUCCH Format 1b with channel selection mode b," R1-110430, 3GPP TSG RAN WG1 Meeting #63bis, Dublin, Ireland, Jan. 17-21, 2011, 11 pages.

Panasonic, "Further considerations of PHICH Linkage for carrier aggregation," R1-091740, 3GPP TSG RAN WG1 Meeting #57, Agenda Item: 15.4 Bandwidth extension, San Francisco, USA, May 4-8, 2009, pp. 1-3.

Panasonic, "UL ACK/NACK transmission on PUCCH for carrier aggregation," R1-091744, 3GPP TSG-RAN WG1 Meeting #57, Agenda Item: 15.4, San Francisco, USA, May 4-8, 2009, 3 pages.

Partial Supplementary European Search Report dated Nov. 20, 2014, for corresponding EP Application No. 12822419.3-1851 / 2704482, 8 pages.

ZTE, "Uplink Control Channel Design for LTE-Advanced," R1-091702, TSG-RAN WG1 #57, Agenda Item: 15.4, San Francisco, USA, May 4-8, 2009, 6 pages.

\* cited by examiner

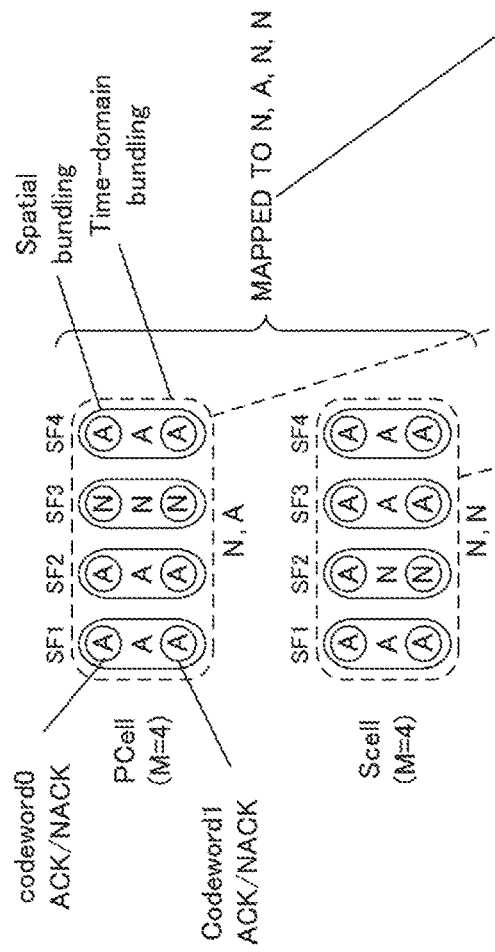
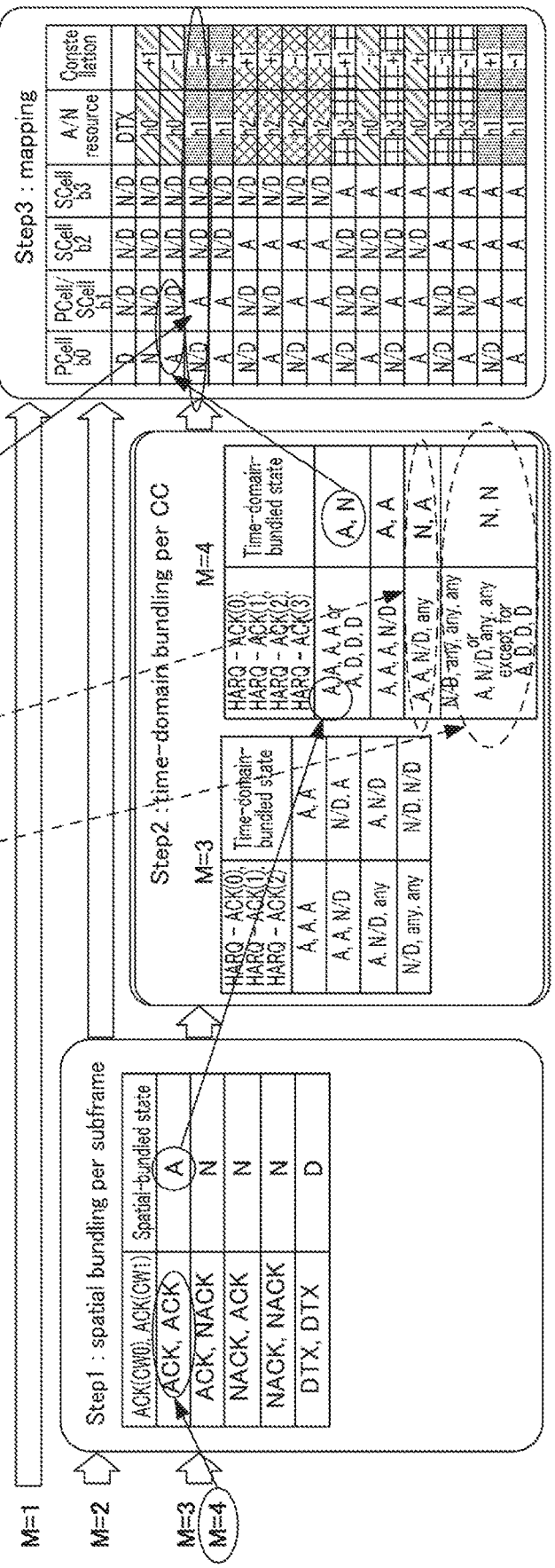
FIG. 6B
FIG. 6A

ACK/NACK REPORTING TIMING OF SCell DIFFERS DEPENDING ON UL/DL Config AND SF NUMBER

FIG. 9A  SCell UL/DL Config#0

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | - | - | 9 | 12 | - | - | - |
| 1 | 7 | 7 | - | - | - | 12 | 12 | - | - | - |
| 2 | 7 | 7 | - | - | - | 12 | 12 | - | - | - |
| 3 | 4 | 12 | - | - | - | 12 | 12 | - | - | - |
| 4 | 12 | 12 | - | - | - | 12 | 12 | - | - | - |
| 5 | 12 | 12 | - | - | - | 12 | 12 | - | - | - |
| 6 | 4 | 7 | - | - | - | 12 | 12 | - | - | - |

FIG. 9B  SCell UL/DL Config#1

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | - | 8 | 9 | 12 | - | - | 13 |
| 1 | 7 | 7 | - | - | 8 | 12 | 12 | - | - | 13 |
| 2 | 7 | 7 | - | - | 12 | 12 | 12 | - | - | 17 |
| 3 | 4 | 12 | - | - | 12 | 12 | 12 | - | - | 13 |
| 4 | 12 | 12 | - | - | 12 | 12 | 12 | - | - | 13 |
| 5 | 12 | 12 | - | - | 12 | 12 | 12 | - | - | 22 |
| 6 | 4 | 7 | - | - | 8 | 12 | 12 | - | - | 13 |

FIG. 9C  SCell UL/DL Config#2

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | 7 | 8 | 9 | 12 | - | 12 | 13 |
| 1 | 7 | 7 | - | 7 | 8 | 12 | 12 | - | 12 | 13 |
| 2 | 7 | 7 | - | 7 | 12 | 12 | 12 | - | 12 | 17 |
| 3 | 4 | 12 | - | 12 | 12 | 12 | 12 | - | 12 | 13 |
| 4 | 12 | 12 | - | 12 | 12 | 12 | 12 | - | 12 | 13 |
| 5 | 12 | 12 | - | 12 | 12 | 12 | 12 | - | 12 | 22 |
| 6 | 4 | 7 | - | 7 | 8 | 12 | 12 | - | 12 | 13 |

FIG. 9D  SCell UL/DL Config#3

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | - | - | 9 | 12 | 12 | 12 | 13 |
| 1 | 7 | 7 | - | - | - | 12 | 12 | 12 | 12 | 13 |
| 2 | 7 | 7 | - | - | - | 12 | 12 | 12 | 12 | 17 |
| 3 | 4 | 12 | - | - | - | 12 | 12 | 13 | 13 | 14 |
| 4 | 12 | 12 | - | - | - | 12 | 12 | 12 | 12 | 13 |
| 5 | 12 | 12 | - | - | - | 12 | 12 | 12 | 12 | 22 |
| 6 | 4 | 7 | - | - | - | 12 | 12 | 12 | 12 | 13 |

FIG. 9E  SCell UL/DL Config#4

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | - | 8 | 9 | 12 | 12 | 12 | 13 |
| 1 | 7 | 7 | - | - | 8 | 12 | 12 | 12 | 12 | 13 |
| 2 | 7 | 7 | - | - | 12 | 12 | 12 | 12 | 12 | 17 |
| 3 | 4 | 12 | - | - | 12 | 12 | 12 | 12 | 12 | 13 |
| 4 | 12 | 12 | - | - | 12 | 12 | 13 | 13 | 13 | 13 |
| 5 | 12 | 12 | - | - | 12 | 12 | 12 | 12 | 12 | 22 |
| 6 | 4 | 7 | - | - | 8 | 12 | 12 | 12 | 12 | 13 |

FIG. 9F  SCell UL/DL Config#5

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | 7 | 8 | 9 | 12 | 12 | 12 | 13 |
| 1 | 7 | 7 | - | 7 | 8 | 12 | 12 | 12 | 12 | 13 |
| 2 | 7 | 7 | - | 7 | 12 | 12 | 12 | 12 | 12 | 17 |
| 3 | 4 | 12 | - | 12 | 12 | 12 | 12 | 12 | 12 | 13 |
| 4 | 12 | 12 | - | 12 | 12 | 12 | 12 | 12 | 12 | 13 |
| 5 | 12 | 12 | - | 12 | 12 | 12 | 12 | 12 | 12 | 22 |
| 6 | 4 | 7 | - | 7 | 8 | 12 | 12 | 12 | 12 | 13 |

FIG. 9G  SCell UL/DL Config#6

| PCell UL/DL Config# \ SCell DL Subframe # | 0 | 1 | 2 | 3 | 4 | 5 | 6 | 7 | 8 | 9 |
|---|---|---|---|---|---|---|---|---|---|---|
| 0 | 4 | 7 | - | - | - | 9 | 12 | - | - | 13 |
| 1 | 7 | 7 | - | - | - | 12 | 12 | - | - | 13 |
| 2 | 7 | 7 | - | - | - | 12 | 12 | - | - | 17 |
| 3 | 4 | 12 | - | - | - | 12 | 12 | - | - | 13 |
| 4 | 12 | 12 | - | - | - | 12 | 12 | - | - | 13 |
| 5 | 12 | 12 | - | - | - | 12 | 12 | - | - | 22 |
| 6 | 7 | 8 | - | - | - | 12 | 13 | - | - | 14 |

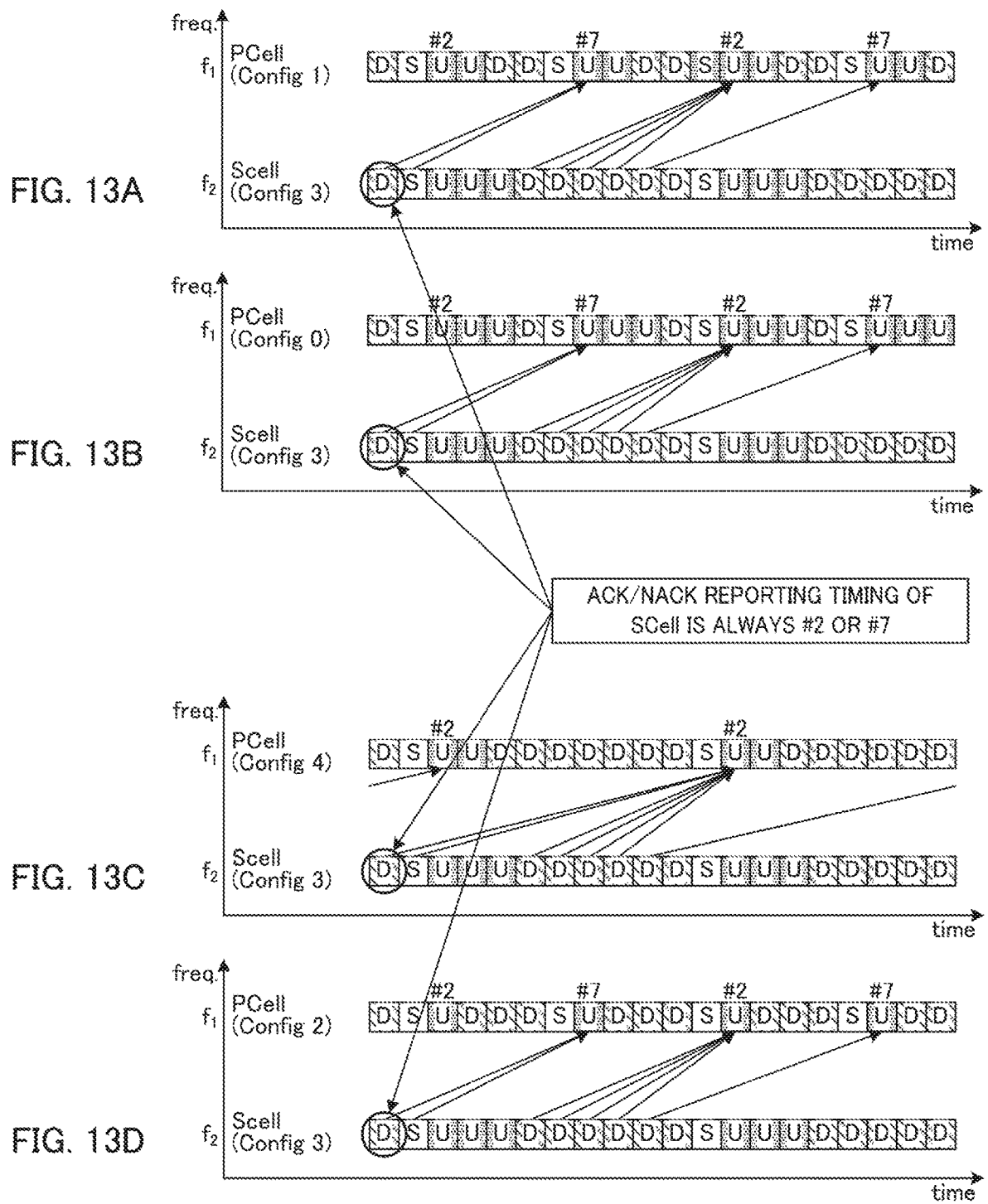

FIG. 14A  SCell UL/DL Config#0

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 4 | 7 | - | - | - | 9 | 12 | - | - | - |
|   | 1 | 7 | 7 | - | - | - | 12 | 12 | - | - | - |
|   | 2 | 7 | 7 | - | - | - | 12 | 12 | - | - | - |
|   | 3 | 12 | 12 | - | - | - | 12 | 12 | - | - | - |
|   | 4 | 12 | 12 | - | - | - | 12 | 12 | - | - | - |
|   | 5 | 12 | 12 | - | - | - | 12 | 12 | - | - | - |
|   | 6 | 7 | 7 | - | - | - | 12 | 12 | - | - | - |

FIG. 14B  SCell UL/DL Config#1

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 7 | 7 | - | - | 12 | 12 | 12 | - | - | 17 |
|   | 1 | 7 | 7 | - | - | 8 | 12 | 12 | - | - | 13 |
|   | 2 | 7 | 7 | - | - | 12 | 12 | 12 | - | - | 17 |
|   | 3 | 12 | 12 | - | - | 12 | 12 | 12 | - | - | 22 |
|   | 4 | 12 | 12 | - | - | 12 | 12 | 12 | - | - | 22 |
|   | 5 | 12 | 12 | - | - | 12 | 12 | 12 | - | - | 22 |
|   | 6 | 7 | 7 | - | - | 12 | 12 | 12 | - | - | 17 |

FIG. 14C  SCell UL/DL Config#2

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 7 | 7 | - | 7 | 12 | 12 | 12 | - | 12 | 17 |
|   | 1 | 7 | 7 | - | 7 | 12 | 12 | 12 | - | 12 | 17 |
|   | 2 | 7 | 7 | - | 7 | 12 | 12 | 12 | - | 12 | 12 |
|   | 3 | 12 | 12 | - | 12 | 12 | 12 | 12 | - | 12 | 22 |
|   | 4 | 12 | 12 | - | 12 | 12 | 12 | 12 | - | 12 | 22 |
|   | 5 | 12 | 12 | - | 12 | 12 | 12 | 12 | - | 12 | 22 |
|   | 6 | 7 | 7 | - | 7 | 12 | 12 | 12 | - | 12 | 17 |

FIG. 14D  SCell UL/DL Config#3

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 7 | 7 | - | - | 12 | 12 | 12 | 12 | 12 | 17 |
|   | 1 | 7 | 7 | - | - | 12 | 12 | 12 | 12 | 12 | 17 |
|   | 2 | 7 | 7 | - | - | 12 | 12 | 12 | 12 | 12 | 17 |
|   | 3 | 4 | 12 | - | - | 12 | 12 | 13 | 13 | 14 |   |
|   | 4 | 12 | 12 | - | - | 12 | 12 | 12 | 12 | 12 | 22 |
|   | 5 | 12 | 12 | - | - | 12 | 12 | 12 | 12 | 12 | 22 |
|   | 6 | 7 | 7 | - | - | 12 | 12 | 12 | 12 | 12 | 17 |

FIG. 14E  SCell UL/DL Config#4

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 7 | 7 | - | - | 12 | 12 | 12 | 12 | 12 | 17 |
|   | 1 | 7 | 7 | - | - | 12 | 12 | 12 | 12 | 12 | 17 |
|   | 2 | 7 | 7 | - | - | 12 | 12 | 12 | 12 | 12 | 17 |
|   | 3 | 12 | 12 | - | - | 12 | 12 | 12 | 12 | 12 | 22 |
|   | 4 | 12 | 12 | - | - | 12 | 12 | 13 | 13 | 13 |   |
|   | 5 | 12 | 12 | - | - | 12 | 12 | 12 | 12 | 12 | 22 |
|   | 6 | 7 | 7 | - | - | 12 | 12 | 12 | 12 | 12 | 17 |

FIG. 14F  SCell UL/DL Config#5

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 7 | 7 | - | 7 | 12 | 12 | 12 | 12 | 12 | 17 |
|   | 1 | 7 | 7 | - | 7 | 12 | 12 | 12 | 12 | 12 | 17 |
|   | 2 | 7 | 7 | - | 7 | 12 | 12 | 12 | 12 | 12 | 17 |
|   | 3 | 12 | 12 | - | 12 | 12 | 12 | 12 | 12 | 12 | 22 |
|   | 4 | 12 | 12 | - | 12 | 12 | 12 | 12 | 12 | 12 | 22 |
|   | 5 | 12 | 12 | - | 12 | 12 | 12 | 12 | 12 | 12 | 22 |
|   | 6 | 7 | 7 | - | 7 | 12 | 12 | 12 | 12 | 12 | 17 |

FIG. 14G  SCell UL/DL Config#6

|   |   | SCell DLSubframe # |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| PCell UL/DL Config# | 0 | 7 | 7 | - | - | - | 12 | 12 | - | - | 17 |
|   | 1 | 7 | 7 | - | - | - | 12 | 12 | - | - | 17 |
|   | 2 | 7 | 7 | - | - | - | 12 | 12 | - | - | 17 |
|   | 3 | 12 | 12 | - | - | - | 12 | 12 | - | - | 22 |
|   | 4 | 12 | 12 | - | - | - | 12 | 12 | - | - | 22 |
|   | 5 | 12 | 12 | - | - | - | 12 | 12 | - | - | 22 |
|   | 6 | 7 | 8 | - | - | - | 12 | 13 | - | - | 14 |

FIG. 16A  SCell UL/DL Config#0

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 4 | 7 |  |  |  | 9 | 12 |  |  |  |
|  | 1 | 7 | 7 | - | - | - | 12 | 12 | - | - | - |
|  | 2 | 7 | 7 | - | - | - | 12 | 12 | - | - | - |
|  | 3 | 4 | 12 | - | - | - | 12 | 12 | - | - | - |
|  | 4 | 12 | 12 | - | - | - | 12 | 12 | - | - | - |
|  | 5 | 12 | 12 | - | - | - | 12 | 12 | - | - | - |
|  | 6 | 4 | 7 | - | - | - | 12 | 12 | - | - | - |

FIG. 16B  SCell UL/DL Config#1

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 7 | 7 | - | - | 8 | 12 | 12 | - | - | 13 |
|  | 1 | 7 | 7 |  |  | 8 | 12 | 12 |  |  | 13 |
|  | 2 | 7 | 7 | - | - | 12 | 12 | - | - | 17 |
|  | 3 | 12 | 12 | - | - | 12 | 12 | - | - | 13 |
|  | 4 | 12 | 12 | - | - | 12 | 12 | - | - | 13 |
|  | 5 | 12 | 12 | - | - | 12 | 12 | - | - | 22 |
|  | 6 | 7 | 7 | - | - | 8 | 12 | 12 | - | - | 13 |

FIG. 16C  SCell UL/DL Config#2

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 7 | 7 | - | 7 | 12 | 12 | 12 | - | 12 | 17 |
|  | 1 | 7 | 7 | - | 7 | 12 | 12 | 12 | - | 12 | 17 |
|  | 2 | 7 | 7 |  | 7 | 12 | 12 | 12 |  | 12 | 12 |
|  | 3 | 12 | 12 | - | 12 | 12 | 12 | 12 | - | 12 | 22 |
|  | 4 | 12 | 12 | - | 12 | 12 | 12 | 12 | - | 12 | 22 |
|  | 5 | 12 | 12 | - | 12 | 12 | 12 | 12 | - | 12 | 22 |
|  | 6 | 7 | 7 | - | 7 | 12 | 12 | 12 | - | 12 | 17 |

FIG. 16D  SCell UL/DL Config#3

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 7 | 7 | - | - | - | 12 | 12 | 13 | 13 | 14 |
|  | 1 | 7 | 7 | - | - | - | 12 | 12 | 12 | 12 | 17 |
|  | 2 | 7 | 7 | - | - | - | 12 | 12 | 12 | 12 | 17 |
|  | 3 | 4 | 12 |  |  |  | 12 | 12 | 13 | 13 | 14 |
|  | 4 | 12 | 12 | - | - | - | 12 | 12 | 12 | 12 | 22 |
|  | 5 | 12 | 12 | - | - | - | 12 | 12 | 12 | 12 | 22 |
|  | 6 | 7 | 7 | - | - | - | 12 | 12 | 13 | 13 | 14 |

FIG. 16E  SCell UL/DL Config#4

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 7 | 7 | - | - | 12 | 12 | 13 | 13 | 13 | 13 |
|  | 1 | 7 | 7 | - | - | 12 | 12 | 13 | 13 | 13 | 13 |
|  | 2 | 7 | 7 | - | - | 12 | 12 | 12 | 12 | 12 | 17 |
|  | 3 | 12 | 12 | - | - | 12 | 12 | 13 | 13 | 13 | 13 |
|  | 4 | 12 | 12 |  |  | 12 | 12 | 13 | 13 | 13 | 13 |
|  | 5 | 12 | 12 | - | - | 12 | 12 | 12 | 12 | 12 | 22 |
|  | 6 | 7 | 7 | - | - | 12 | 12 | 13 | 13 | 13 | 13 |

FIG. 16F  SCell UL/DL Config#5

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 7 | 7 | - | 7 | 12 | 12 | 12 | 12 | 12 | 17 |
|  | 1 | 7 | 7 | - | 7 | 12 | 12 | 12 | 12 | 12 | 17 |
|  | 2 | 7 | 7 | - | 7 | 12 | 12 | 12 | 12 | 12 | 17 |
|  | 3 | 12 | 12 | - | 12 | 12 | 12 | 12 | 12 | 12 | 22 |
|  | 4 | 12 | 12 | - | 12 | 12 | 12 | 12 | 12 | 12 | 22 |
|  | 5 | 12 | 12 |  | 12 | 12 | 12 | 12 | 12 | 12 | 22 |
|  | 6 | 7 | 7 | - | 7 | 12 | 12 | 12 | 12 | 12 | 17 |

FIG. 16G  SCell UL/DL Config#6

|  |  | SCell DLSubframe # |  |  |  |  |  |  |  |  |  |
|---|---|---|---|---|---|---|---|---|---|---|---|
|  |  | 0 | 1 | 2 | 3 | 4 | 5 | 6 | 7 | 8 | 9 |
| PCell UL/DL Config# | 0 | 7 | 8 | - | - | - | 12 | 13 | - | - | 14 |
|  | 1 | 7 | 8 | - | - | - | 12 | 13 | - | - | 17 |
|  | 2 | 7 | 7 | - | - | - | 12 | 12 | - | - | 17 |
|  | 3 | 12 | 12 | - | - | - | 12 | 13 | - | - | 14 |
|  | 4 | 12 | 12 | - | - | - | 12 | 13 | - | - | 22 |
|  | 5 | 12 | 12 | - | - | - | 12 | 12 | - | - | 22 |
|  | 6 | 7 | 8 |  |  |  | 12 | 13 |  |  | 14 |

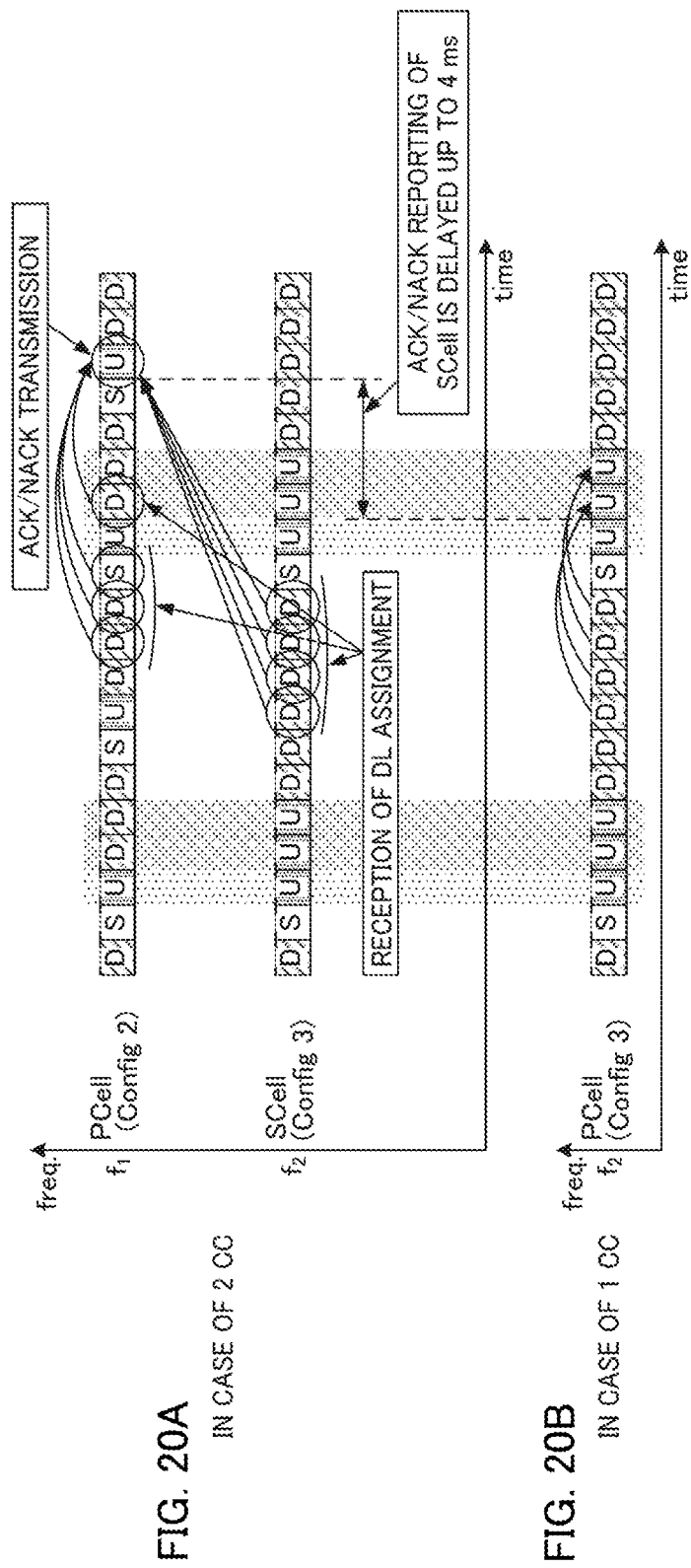

TERMINAL DEVICE, BASE STATION DEVICE, AND TRANSMISSION/RECEPTION METHOD

BACKGROUND

Technical Field

The present disclosure relates to a terminal apparatus, a base station apparatus, and a transmission and reception method.

Description of the Related Art

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via a downlink control channel, such as Physical Downlink Control CHannel (PDCCH), as appropriate, to the terminal with which a communication link has been established.

The terminal performs "blind-determination" on each of a plurality of control information items included in the received PDCCH signal (i.e., Downlink (DL) Assignment Control Information: also referred to as Downlink Control Information (DCI)). To put it more specifically, each of the control information items includes a Cyclic Redundancy Check (CRC) part and the base station masks this CRC part using the terminal ID of the transmission target terminal. Accordingly, until the terminal demasks the CRC part of the received control information item with its own terminal ID, the terminal cannot determine whether or not the control information item is intended for the terminal. In this blind-determination, if the result of demasking the CRC part indicates that the CRC operation is OK, the control information item is determined as being intended for the terminal.

Moreover, in 3GPP LTE, Automatic Repeat Request (ARQ) is applied to downlink data to terminals from a base station. More specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signal (i.e., ACK/NACK signal (hereinafter, may be referred to as "A/N," simply)).

The control information to be transmitted from a base station herein includes resource assignment information including information on resources assigned to the terminal by the base station. As described above, PDCCH is used to transmit this control information. The PDCCH includes one or more L1/L2 control channels (L1/L2 CCH). Each L1/L2 CCH consists of one or more Control Channel Elements (CCE). More specifically, a CCE is the basic unit used to map the control information to a PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of a PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. More specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4:$W_0$-$W_3$ (may be referred to as Walsh Code Sequence)) and a DFT sequence (length-3: $F_0$-$F_3$). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving a downlink assignment control signal because the terminal performs blind-determination in each subframe to find a downlink assignment control signal intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signal intended for the terminal on a certain downlink component carrier, the terminal generates no response signal for the downlink data on the downlink component carrier. This error case is defined as discontinuous transmission of ACK/NACK signal (DTX of response signal) in the sense that the terminal transmits no response signal.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). In FIG. 2, however, "subcarriers" in the vertical axis of the drawing are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. More specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communications than 3GPP LTE has been carried out. 3GPP LTE-Advanced systems (may be referred to as "LTE-A system," hereinafter) follow LTE systems. 3GPP LTE-Advanced is expected to introduce base stations and terminals capable of communicating with each other using a wideband frequency of 40 MHz or greater to realize a downlink transmission rate up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. Moreover, in a Frequency Division Duplex (FDD) system, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. In addition, the term "component carrier" may be also referred to as "CC(s)" as an abbreviation.

In a Time Division Duplex (TDD) system, a downlink component carrier and an uplink component carrier are in the same frequency band, and downlink communication and uplink communication are realized by time-division switching between uplink and downlink. Therefore, in the case of the TDD system, the downlink component carrier can also be expressed as "downlink communication timing in the component carrier." The uplink component carrier can also be expressed as "uplink communication timing in the component carrier." The switching between the downlink component carrier and the uplink component carrier is based on the UL-DL Configuration, as shown in FIG. 3. In the UL-DL Configuration shown in FIG. 3, the timing of downlink communication (DL: Downlink) and uplink communication (UL: Uplink) per one frame (10 msec) in units of a subframe (that is, 1 msec unit) is set. The UL-DL Configuration can build a communication system that can flexibly respond to the requests of throughput for uplink communication and throughput for downlink communication by changing the subframe ratio of uplink communication and downlink communication. For example, FIG. 3 shows UL-DL Configurations (Config 0 to Config 6) whose subframe ratios of uplink communication and downlink communication are different. In addition, in FIG. 3, a downlink communication subframe is expressed as "D," an uplink communication subframe is expressed as "U," and a special subframe is expressed as "S." Here, the special subframe is a subframe at the time of switching from a downlink communication subframe to an uplink communication subframe. In addition, in the special subframe, downlink data communication may be performed similar to the downlink communication subframe. In addition, in each UL-DL Configuration shown in FIG. 3, subframes (20 subframes) of two frames are divided into subframes ("D" and "S" in the upper stage) used in downlink communication and subframes ("U" in the lower stage) used in uplink communication and are thus expressed in two stages. In addition, as shown in FIG. 3, results (ACK/NACK) of error detection on downlink data are reported in the fourth uplink communication subframe from the subframe to which the downlink data is assigned, or an uplink communication subframe after the fourth subframe.

In the LTE-A system, communication using a band obtained by bundling some component carriers, a so-called Carrier aggregation (CA) is supported. In addition, although the UL-DL Configuration can be set for each component carrier, a terminal supporting the LTE-A system (hereinafter, referred to as "LTE-A terminal") is designed on the assumption that the same UL-DL Configuration is set for a plurality of component carriers.

FIGS. 4A and 4B are diagrams for explaining asymmetric Carrier aggregation applied to an individual terminal and the control sequence.

As illustrated in FIG. 4B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communication is set for terminal 2.

Referring to terminal 1, a base station (i.e., a base station supporting the LTE-A system (hereinafter, referred to as "LTE-A base station")) and an LTE-A terminal included in the LTE-A system transmit and receive signals to and from each other in accordance with the sequence diagram illustrated in FIG. 4A. As illustrated in FIG. 4A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communications with the base station by transmitting, for example, a connection request to the base station. (3) Upon determining that a plurality of downlink component carriers need to be assigned to the terminal, the base station instructs the terminal to add a downlink component carrier. However, in this case, there is no increase in the number of uplink component carriers, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, there are channel selection (also referred to as "multiplexing"), bundling and a discrete Fourier transform spread orthogonal frequency division multiplexing (DFT-S-OFDM) format as a method of transmitting a plurality of response signals for the plurality of pieces of downlink data. In channel selection, not only symbol points used for response signals, but also the resources to which the response signals are mapped are varied in accordance with the pattern for results of the error detection on the plurality of pieces of downlink data by the terminal. Compared with channel selection, in bundling, ACK or NACK signals generated according to the results of error detection on the plurality of pieces of downlink data are bundled (i.e., bundled by calculating a logical AND of the results of error detection on the plurality of pieces of downlink data, provided that ACK=1 and NACK=0), and response signals are transmitted using one predetermine resource by the terminal. In transmission using the DFT-S-OFDM format, a terminal jointly encodes (i.e., joint coding) the response signals for the plurality of pieces of downlink data and transmits the coded data using the format (see, NPL 5). For example, a terminal may feedback the response signals (i.e., ACK/NACK) using channel selection, bundling or DFT-S-OFDM according to the number of bits for a pattern for results of error detection. Alternatively, a base station may previously configure the method of transmitting the response signals.

More specifically, channel selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data for each downlink component carrier received on the plurality of downlink component carriers (up to two downlink component carriers) are each an ACK or NACK as illustrated in FIG. 5. Meanwhile, bundling is a technique that bundles ACK/NACK signals for the plurality of pieces of downlink data into a single set of signals and thereby transmits the bundled signals using one predetermined resource (see, NPLs 6 and 7). Hereinafter, the set of the signals formed by bundling ACK/NACK signals for a plurality of pieces of downlink data into a single set of signals may be referred to as "bundled ACK/NACK signals".

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is allocated in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously report a PUCCH resource to each terminal from a base station (i.e., explicit signaling) (hereinafter, method 2). To put it differently, each terminal transmits response signals using the PUCCH resource previously reported by the base station in method 2.

In addition, as shown in FIG. 5, the terminal transmits a response signal using one of the two component carriers. The component carrier used to transmit such a response signal is called a Primary Component Carrier (PCC) or a Primary Cell (PCell). In addition, the other component carrier is called a Secondary Component Carrier (SCC) or a Secondary Cell (SCell). For example, the PCC (PCell) is a component carrier used to transmit broadcast information (for example, SIB2 (System Information Block type 2)) regarding a component carrier used to transmit the response signal.

In method 2, PUCCH resources common to a plurality of terminals (e.g., four PUCCH resources) may be previously reported to the terminals from a base station. For example, terminals may employ a method to select one PUCCH resource to be actually used, on the basis of a transmit power control (TPC) command of two bits included in DCI in SCell. In this case, the TPC command is called an ACK/NACK resource indicator (ARI). Such a TPC command allows a certain terminal to use an explicitly signaled PUCCH resource in a certain frame while allowing another terminal to use the same explicitly signaled PUCCH resource in another subframe in the case of explicit signaling.

Meanwhile, in channel selection, a PUCCH resource in an uplink component carrier associated in a one-to-one correspondence with the top CCE index of the CCEs occupied by the PDCCH indicating the Physical Downlink Shared CHannel (PDSCH) in PCC (PCell) (i.e., PUCCH resource in PUCCH region 1 in FIG. 5) is assigned (implicit signaling).

Next, a description will be provided regarding ARQ control using channel selection when the asymmetric carrier aggregation described above is applied to terminals with reference to FIGS. 5 and 6.

A component carrier group (may be referred to as "component carrier set" in English) consisting of component carrier 1 (PCell), component carrier 2 (SCell) and uplink component carrier 1 is configured for terminal 1 as illustrated in FIG. 5. In this case, after downlink resource assignment information is transmitted via a PDCCH of each of component carriers 1 and 2, downlink data is transmitted using the resource corresponding to the downlink resource assignment information.

In addition, in channel selection, response signals indicating the results of error detection on a plurality of pieces of downlink data in the component carrier 1 (PCell) and the results of error detection on a plurality of pieces of downlink data in the component carrier 2 (SCell) are mapped to the PUCCH resources included in the PUCCH region 1 or the PUCCH region 2. In addition, the terminal uses either two types of phase points (Binary Phase Shift Keying (BPSK) mapping) or four types of phase points (Quadrature Phase Shift Keying (QPSK) mapping) as a response signal. That is, in channel selection, it is possible to express the patterns of the results of error detection on a plurality of pieces of downlink data in the component carrier 1 (PCell) and the results of error detection on a plurality of pieces of downlink data in the component carrier 2 (SCell) using the combination of PUCCH resources and phase points.

Here, a method of mapping the patterns of results of error detection when there are two component carriers (when there are one PCell and one SCell) in the TDD system is shown in FIG. 6A.

In addition, in FIG. 6A, a case is assumed in which a transmission mode is set to one of the following transmission modes (a), (b), and (c).

(a) Transmission mode in which each component carrier supports only downlink one-CW transmission (b) Transmission mode in which one component carrier supports only downlink one-CW transmission and the other component carrier supports up to downlink two-CW transmission (c) Transmission mode in which each component carrier supports up to downlink two-CW transmission In addition, in FIG. 6A, a case is assumed in which a number M, which indicates the results of error detection for how many downlink communication subframes (hereinafter, described as DownLink (DL) subframes; "D" or "S" shown in FIG. 3) per component carrier need to be reported to the base station in one uplink communication subframe (hereinafter, described as UpLink (UL) subframes; "U" shown in FIG. 3), is set to one of the following settings (1) to (4). For example, in Config 2 shown in FIG. 3, since the results of error detection of four DL subframes is reported to the base station in one UL subframe, M=4 is set.

(1) M=1
(2) M=2
(3) M=3
(4) M=4

That is, FIG. 6A shows a method of mapping the patterns of error detection results when the above-described (a) to (c) and the above-described (1) to (4) are combined. In addition, the value of M changes with the UL-DL Configuration (Config 0 to Config 6) and the subframe number (SF #0 to SF #9) in one frame, as shown in FIG. 3. In addition, in Config 5 shown in FIG. 3, M=9 is set in the subframe (SF) #2. In this case, however, in the TDD system of LTE-A, the terminal reports the error detection result using, for example, a DFT-S-OFDM format without applying channel selection. Therefore, in FIG. 6A, Config 5 (M=9) is not included in the above-described combination.

In the case of (1), the number of patterns of error detection results is $2^2 \times 1 = 4$ patterns, $2^3 \times 1 = 8$ patterns, and $2^4 \times 1 = 16$ patterns in order of (a), (b), and (c). In the case of (2), the number of patterns of error detection results is $2^2 \times 2 = 8$ patterns, $2^3 \times 2 = 16$ patterns, and $2^4 \times 2 = 32$ patterns in order of (a), (b), and (c). The same is true for the cases of (3) and (4).

Here, a case where the phase difference between the phase points mapped in one PUCCH resource is at least 90° (that is, a case where up to 4 patterns per one PUCCH resource are mapped) is assumed. In this case, the number of PUCCH resources required for mapping all patterns of error detection results is $2^4 \times 4 \div 4 = 16$ in cases of (4) and (c) where the number of patterns of error detection results becomes a maximum ($2^4 \times 4 = 64$ patterns), which is not practical. Therefore, in the TDD system, the amount of information of error detection results is made to intentionally be missing by bundling the error detection results in a spatial domain and further in a time domain when necessary. In this manner, the number of PUCCH resources required for the reporting of error detection result patterns is limited.

In the TDD system of LTE-A, in the case of (1), the terminal maps the error detection result patterns of 4 patterns, 8 patterns, and 16 patterns to two, three, and four PUCCH resources, respectively, in order of (a), (b), and (c) without bundling the error detection results (Step3 in FIG. 6A). That is, the terminal reports a 1-bit error detection result per component carrier for which a transmission mode (non-MIMO) that supports only one-CW (codeword) transmission in the downlink is set, and reports a 2-bit error detection result per component carrier for which a transmission mode (MIMO) that supports up to two-CW transmission in the downlink is set.

In the TDD system of LTE-A, also in cases of (2) and (a), the terminal maps the error detection result patterns of 8 patterns to four PUCCH resources without bundling the error detection results (Step3 in FIG. 6A). In this case, the terminal reports a 2-bit error detection result per one downlink component carrier.

In the TDD system of LTE-A, also in cases of (2) and (b) (also the same for (2) and (c)), the terminal bundles (spatially bundles) (Step1 in FIG. 6A) error detection results of the component carrier for which a transmission mode that supports up to two-CW transmission in the downlink is set, in a spatial domain. In the spatial bundling, for example, when an error detection result for at least one CW of error detection results of two CWs is NACK, the error detection result after the spatial bundling is determined to be NACK. That is, in the spatial bundling, logical AND (Logical And) is taken for the error detection results of two CWs. Then, the terminal maps an error detection result pattern after spatial bundling (8 patterns in cases of (2) and (b), and 16 patterns in cases of (2) and (c)) to four PUCCH resources (Step3 in FIG. 6A). In this case, the terminal reports a 2-bit error detection result per one downlink component carrier.

In the TDD system of LTE-A, also in cases of (3) or (4) and (a), (b), or (c), the terminal performs bundling in a time domain (time-domain bundling) after spatial bundling (Step1) (Step2 in FIG. 6A). Then, the terminal maps the error detection result patterns after time-domain bundling to four PUCCH resources (Step3 in FIG. 6A). In this case, the terminal reports a 2-bit error detection result per one downlink component carrier.

Next, an example of a specific mapping method is shown using FIG. 6B. FIG. 6B shows examples when there are two downlink component carriers (one PCell and one SCell) and when "(c) transmission mode in which each component carrier supports up to downlink two-CW transmission" is set and "(4) M=4".

In FIG. 6B, the error detection results of PCell are (ACK(A), ACK), (ACK, ACK), (NACK(N), NACK), and (ACK, ACK) in order of (CW0, CW1) in four DL subframes (SF1 to SF4). In the PCell shown in FIG. 6B, since M=4, the terminal performs spatial bundling of these in Step1 in FIG. 6A (portions surrounded by the solid lines in FIG. 6B). As a result of spatial bundling, ACK, ACK, NACK, and ACK are obtained in this sequence in four DL subframes of the PCell shown in FIG. 6B. In addition, in Step2 in FIG. 6A, the terminal performs time-domain bundling for the 4-bit error detection result pattern (ACK, ACK, NACK, ACK) after spatial bundling obtained in Step1 (portion surrounded by the dotted line in FIG. 6B). As a result, in the PCell shown in FIG. 6B, a 2-bit error detection result of (NACK, ACK) is obtained.

The terminal performs spatial bundling and time-domain bundling similarly for the SCell shown in FIG. 6B, thereby obtaining a 2-bit error detection result of (NACK, NACK).

In addition, in Step3 in FIG. 6A, the terminal puts together 2-bit error detection result patterns of the PCell and the SCell after time-domain bundling into 4-bit error detection result patterns (NACK, ACK, NACK, NACK) by combining them in order of the PCell and the SCell. The terminal determines a PUCCH resource (in this case, h1) and a phase point (in this case, −j) using a mapping table showing in Step3 in FIG. 6A for the 4-bit error detection result pattern.

CITATION LIST

Non-Patent Literature

NPL 1
3GPP TS 36.211 V10.1.0, "Physical Channels and Modulation (Release 9)," March 2011
NPL 2
3GPP TS 36.212 V10.1.0, "Multiplexing and channel coding (Release 9)," March 2011
NPL 3
3GPP TS 36.213 V10.1.0, "Physical layer procedures (Release 9)," March 2011
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
Ericsson and ST-Ericsson, "A/N transmission in the uplink for carrier aggregation," R1-100909, 3GPP TSG-RAN WG1#60, February 2010
NPL 6
ZTE, 3GPP RAN1 meeting #57, R1-091702, "Uplink Control Channel Design for LTE-Advanced," May 2009
NPL 7
Panasonic, 3GPP RAN1 meeting #57, R1-091744, "UL ACK/NACK transmission on PUCCH for Carrier aggregation," May 2009

BRIEF SUMMARY

Technical Problem

As described above, the LTE-A terminal is designed on the assumption that the same UL-DL Configuration is set for a plurality of component carriers.

Incidentally, it has been discussed setting the following UL-DL Configuration when a communication carrier that provides the TDD system of LTE-A newly assigns a frequency band for the LTE-A service. That is, the communication carrier sets the UL-DL Configuration of the newly assigned frequency band to be different from the UL-DL Configuration of the existing frequency band depending on to which services the focus of the communication carrier is given. Specifically, in a communication carrier that emphasizes the throughput of the downlink communication, a UL-DL Configuration (for example, Config 3, Config 4, or Config 5 in FIG. 3) in which the ratio of DL subframes to UL subframes is large is used for a new frequency band. As a result, a more flexible system is constructed.

However, a method of bundling error detection results when different UL-DL Configurations are set for component carriers, that is, when the value of "M" is different between component carriers has not been studied so far.

FIGS. 7A and 7B show examples of a method of reporting the error detection result when different UL-DL Configurations are set for component carriers. For example, in FIGS. 7A and 7B, a component carrier (frequency f1) for which Config 1 is set is the PCell, and a component carrier (frequency f2) for which Config 3 is set is the SCell.

FIG. 7A is a method of reporting the error detection result independently in each component carrier of the PCell and the SCell. In the method shown in FIG. 7A, complexity is low since the terminal can report an error detection result independently in each component carrier. In the method shown in FIG. 7A, however, resources (A/N resources) for transmitting an error detection result (response signal) to each of two component carriers are required. In addition, in the method shown in FIG. 7A, a base station needs to perform decoding processing in parallel (that is, 2-parallel processing) for the error detection results of two component carriers. That is, in the method shown in FIG. 7A, double A/N resources and double decoding processing are required compared with 3GPP Release 10 (Rel-10) in which only one component carrier (1 CC) is configured for the terminal.

In addition, when up to five component carriers (5 CCs) are configured for the terminal, A/N resources for up to 5 CCs are required. In addition, in the base station, it is necessary to perform decoding processing on error detection results in up to 5-parallel processing (error detection result of 1 CC/1-parallel processing). Here, when the UL-DL Configuration is always the same between component carriers, the timing of the UL subframe in the respective component carriers is the same. Therefore, even if up to five component carriers (5 CCs) are configured for the terminal, A/N resources for only 1 CC are required as the amount of A/N resources. In addition, decoding processing on error detection results in the base station also requires only 1-parallel processing (processing on the error detection result of 1 CC) when up to 5CCs are configured. In contrast, when different UL-DL Configurations are set for component carriers, A/N resources and decoding processing amount up to 5 times are required.

On the other hand, the method shown in FIG. 7B is a method of always reporting the error detection result of each component carrier collectively in the PCell. That is, in the method shown in FIG. 7B, error detection results of both the PCell and the SCell are transmitted in the UL subframe of the PCell. In the method shown in FIG. 7B, since the terminal always reports the error detection results from the PCell, A/N resources for only 1 CC of the PCell can be used. In addition, decoding processing on the error detection results in the base station may also be 1-parallel processing (error detection results up to 5 CCs/1-parallel processing).

However, depending on the combination of UL-DL Configurations set for the PCell and the SCell, the reporting timing of the error detection result of the SCell may be changed compared with that in the case of 1 CC. For example, in FIG. 7B, the earliest reporting timing for the result of error detection on the data of the subframe #0 of the SCell, for which Config 3 is set, is the subframe #7 of the PCell. However, as shown in FIG. 3, when Config 3 is set only for the single component carrier (1 CC), the reporting timing for the result of error detection on the data of the subframe #0 is the subframe #4. Thus, the reporting timing of the error detection results differs depending on the combination of a plurality of UL-DL Configurations and subframe numbers. In this case, processing on the error detection results of the base station and the terminal becomes very complicated, and the number of test cases in the development stage of the base station and the terminal increases.

Complication of the processing will be described more specifically with reference to FIGS. 8A to 8D. FIGS. 8A to 8D show the reporting timing of the error detection result (A/N) when Config 3 is set for the SCell and a different UL-DL Configuration is set for the PCell. In the methods shown in FIGS. 8A to 8D, as in the method shown in FIG. 7B, the terminal always performs communication of the error detection result on the downlink data of the SCell in the PCell.

In FIG. 8A, as in FIG. 7B, Config 1 is set for the PCell and Config 3 is set for the SCell. In FIGS. 8B, 8C, and 8D, the UL-DL Configuration set for the PCell is different from that in FIG. 8A, and Config 0, Config 4, and Config 2 are set in this sequence for the PCell. Here, referring to the subframe #0, a case where a terminal reports the result of error detection on the downlink data, which is received in the SCell, at the earliest timing of the PCell will be discussed. When the PCell includes Config 1 and Config 2 as in FIGS. 8A and 8D, the terminal reports the result of error detection on the downlink data, which is received in the subframe #0 of the SCell, in the subframe #7. When the PCell is Config 0 as in FIG. 8B, the terminal reports the result of error detection on the downlink data, which is received in the subframe #0 of the SCell, in the subframe #4. When the PCell is Config 4 as in FIG. 8C, the terminal reports the result of error detection on the downlink data, which is received in the subframe #0 of the SCell, in the subframe #12 (subframe #2 of the next frame (1 frame includes 10 subframes)). Thus, when different UL-DL Configurations are set for the PCell and the SCell, the terminal reports the result of error detection on the downlink data, which is received in the same subframe of the SCell, at the different timing from the PCell. That is, depending on the combination of a plurality of UL-DL Configurations and subframe numbers to receive downlink data in the SCell, the terminal reports the result of error detection on the downlink data at the different timing of the PCell. Therefore, in the methods shown in FIGS. 8A to 8D, the base station and the terminal should set the reporting timing of the error detection result according to the combination of a plurality of UL-DL Configurations (7×7=49 in the case of two types) and subframe numbers (up to 9 subframe numbers in the case of Config 5) in advance. Since the number of combinations is too large, processing on the reporting of the error detection results in the base station and the terminal becomes very complicated. In addition, the number of test cases in the development stage of the base station and the terminal increases.

FIGS. 9A to 9G show data tables showing the reporting timing of the error detection result (in which subframe of the PCell the error detection result is reported) according to the combination of UL-DL Configurations of two cells (PCell and SCell) and subframe numbers to receive the downlink data. The plurality of data tables in FIGS. 9A to 9G are data tables when the UL-DL Configuration of the SCell is Config 0 to Config 6, respectively. The reporting timing when the UL-DL Configuration of the PCell is Config 0 to Config 6 is shown in a plurality of rows of each data table. In addition, the reporting timing of the result of error detection on downlink data received in the subframe numbers #0 to #9 of the SCell is shown in a plurality of columns. In addition, in FIGS. 9A to 9G, the reporting timing when the same UL-DL Configuration is set for two cells is shown by shaded diagonal lines, and the reporting timing dispersed due to the combination of UL-DL Configurations is shown by shaded dots.

For example, as shown in FIG. 9D, when the SCell is Config 3 and the UL-DL Configuration of the PCell is different from the UL-DL Configuration of the SCell (that is, other than Config 3), the reporting timing is as follows. That is, the reporting timing of the result of error detection on the received data of the subframe #0 of the SCell is the subframe #4 when the PCell is Config 0, Config 3, or Config 6. When the PCell is Config 1 or Config 2, the reporting timing described above is the subframe #7. When the PCell is Config 4 or Config 5, the reporting timing described above is the subframe #12 (that is, a subframe #2 of the next frame (1 frame includes 10 subframes)).

That is, the reporting timing of the result of error detection on the received data of the subframe #9 of the SCell is the subframe #13 (that is, subframe #3 of the next frame) when the PCell is Config 0, Config 1, Config 4, or Config 6. When the PCell is Config 2, the reporting timing is the subframe #17 (that is, subframe #7 of the next frame). When the PCell is Config 5, the reporting timing is the subframe #22 (that is, subframe #2 of the next frame).

It is an object of the present disclosure to prevent the reporting timings of a result of error detection on downlink data received in an SCell from being complicatedly dispersed when ARQ is applied in communication using a plurality of component carriers and the UL-DL Configuration (ratio of UL subframes and DL subframes) set for each component carrier is different. In addition, it is an object of the present disclosure to provide a terminal apparatus, a base station apparatus, and a transmission and reception method capable of simplifying response signal transmission processing in a terminal and a response signal receiving processing in a base station.

Solution to Problem

A terminal apparatus according to an aspect of the present disclosure is an apparatus that communicates with a base station apparatus using a plurality of component carriers including a first component carrier (e.g., component carrier of PCell) and a second component carrier (e.g., component carrier of SCell) to be respectively set with configuration patterns each specifying an arrangement of a plurality of types of subframes including a downlink communication subframe and an uplink communication subframe within one frame, the terminal apparatus including: a receiving section that receives pieces of downlink data respectively using the plurality of component carriers; an error detecting section that detects an error of each of the pieces of the downlink data; a generating section that generates a response signal indicating an error detection result of each of the pieces of downlink data, the result being obtained by the error detecting section; and a control section that transmits the response signal to the base station apparatus, in which: the first component carrier and the second component carrier are capable of being respectively set with the configuration patterns which are different from each other; the control section transmits, using the first component carrier, the response signal for the piece of downlink data received using the second component carrier; when a subframe of the first component carrier is a downlink communication subframe and a subframe of the second component carrier is an uplink communication subframe in a reference transmission period of the response signal for the piece of downlink data received using the second component carrier, the control section transmits the response signal for the piece of the downlink data in a specific uplink communication subframe set for the first component carrier; and the specific uplink communication subframe is set one by one in each minimum period in which a switching point of the types of subframes appears periodically, and the specific uplink communication subframe is an uplink communication subframe arranged at an identical period within the minimum period.

A transmission and reception method according to an aspect of the present disclosure is a method in which a base station apparatus and a terminal apparatus transmit and receive a radio signal to and from each other using a plurality of component carriers including a first component carrier and a second component carrier to be respectively set with configuration patterns each specifying an arrangement of a plurality of types of subframes including a downlink communication subframe and an uplink communication subframe within one frame, the method including: setting the configuration patterns respectively in the first component carrier and the second component carrier by the base station apparatus, the configuration patterns being different from each other; receiving pieces of downlink data respectively using the plurality of component carriers by the terminal apparatus; detecting an error of each of the pieces of the downlink data by the terminal apparatus; generating, by the terminal apparatus, the response signal indicating an error detection result of each of the piece of downlink data, the result being obtained by detecting the error; and transmitting by the terminal apparatus, in a specific uplink communication subframe set for the first component carrier, the response signal for the piece of downlink data received using the second component carrier, in a case where a subframe of the first component carrier is a downlink communication subframe and a subframe of the second component carrier is an uplink communication subframe when a period required for generating the response signal elapses since reception of the piece of downlink data in the second component carrier; wherein the specific uplink communication subframe is set one by one in each minimum period in which a switching point of the types of subframes appears periodically, and the specific uplink communication subframe is an uplink communication subframe arranged at an identical period within the minimum period.

Advantageous Effects of Disclosure

According to the present disclosure, a situation is avoided where the reporting timings of a result of error detection on downlink data received in an SCell are complicatedly dispersed when ARQ is applied in communication using a plurality of component carriers and the UL-DL Configuration (ratio of UL subframes and DL subframes) set for each component carrier is different. Therefore, it is possible to simplify response signal transmission processing in a terminal and a response signal receiving processing in a base station.

BRIEF DESCRIPTION OF THE SEVERAL VIEWS OF THE DRAWINGS

FIGS. 6A and 6B are diagrams provided for describing a bundling method and a mapping method in TDD;

FIGS. 9A to 9G are diagrams showing the reporting timings of a response signal according to the combination of UL-DL Configurations of the PCell and the SCell and a subframe number to receive downlink data;

FIGS. 13A to 13D are diagrams showing the reporting timings of a response signal according to Embodiment 1 of the present disclosure;

FIGS. 14A to 14G are diagrams showing the reporting timings of a response signal according to the combination of UL-DL Configurations of the PCell and the SCell and a subframe number to receive downlink data according to Embodiment 1 of the present disclosure;

FIGS. 16A to 16G are diagrams showing the reporting timings of a response signal according to the combination of UL-DL Configurations of the PCell and the SCell and a subframe number to receive downlink data according to Embodiment 2 of the present disclosure;

FIGS. 20A and 20B are diagrams illustrating delay of a response signal according to an embodiment of the present disclosure.

DETAILED DESCRIPTION

Figure 1:
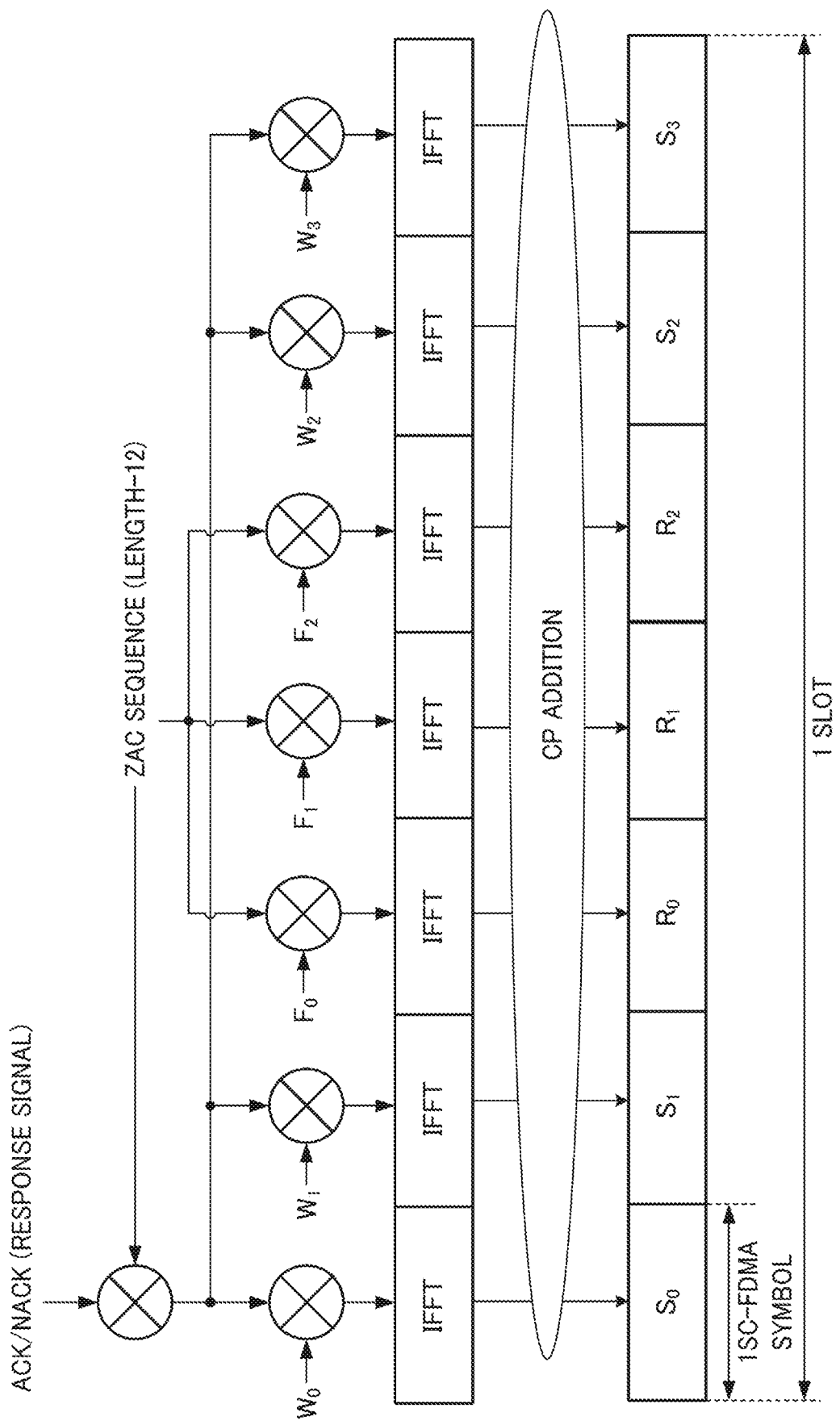
FIG. 1 is a diagram illustrating a method of spreading response signals and reference signals.
Figure 2:
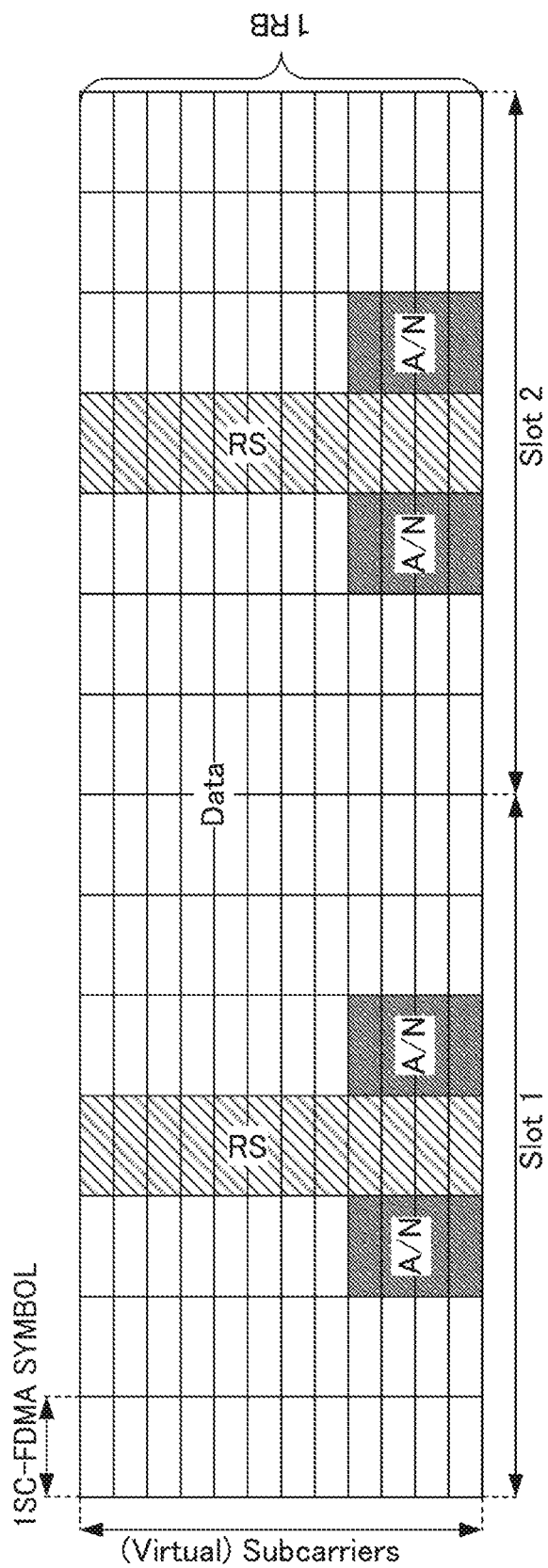
FIG. 2 is a diagram illustrating an operation related to a case where TDM is applied to response signals and uplink data on PUSCH resources.

Hereinafter, embodiments of the present disclosure will be described in detail with reference to the accompanying drawings. Throughout the embodiments, the same elements are assigned the same reference numerals and any duplicate description of the elements is omitted.

Embodiment 1

Figure 10:
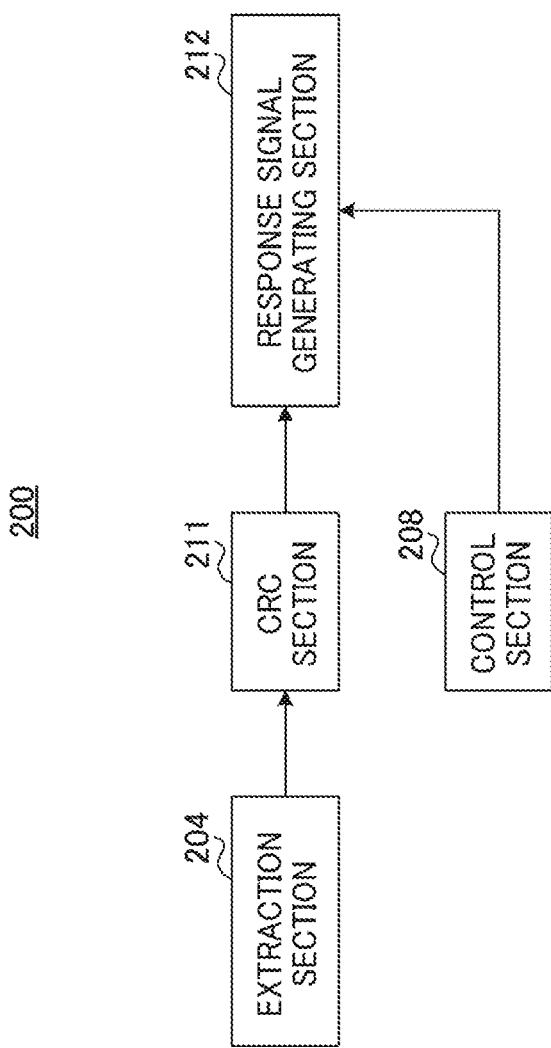
FIG. 10 is a block diagram showing the main configuration of a terminal according to Embodiment 1 of the present disclosure.

FIG. 10 is a main block diagram of terminal 200 according to the present embodiment. Terminal 200 communicates with base station 100 using a plurality of component carriers including first and second component carriers. In addition, a configuration pattern (DL-UL Configuration) including a downlink communication subframe (DL subframe) used in downlink communication and an uplink communication subframe (UL subframe) used in uplink communication, which is a configuration pattern of subframes included in one frame, is set for each component carrier configured in terminal 200. In terminal 200, extraction section 204 receives downlink data in a plurality of component carriers, CRC section 211 detects an error of downlink data, response signal generating section 212 generates a response signal using the result of error detection on the downlink data obtained in CRC section 211, and control section 208 transmits the response signal to base station 100.

Control section 208 transmits a response signal, which includes the result of error detection on the data received in the second component carrier, in the subframe #2 or the subframe #7 of the first component carrier. Different UL DL Configurations can be set for the first and second component carriers. Hereinafter, the UL DL Configuration set for the first component carrier may be called "first UL DL Configuration" or "first configuration pattern." In addition, the UL DL Configuration set for the second component carrier may be called "second UL DL Configuration" or "second configuration pattern."

[Configuration of Base Station]

Figure 11:
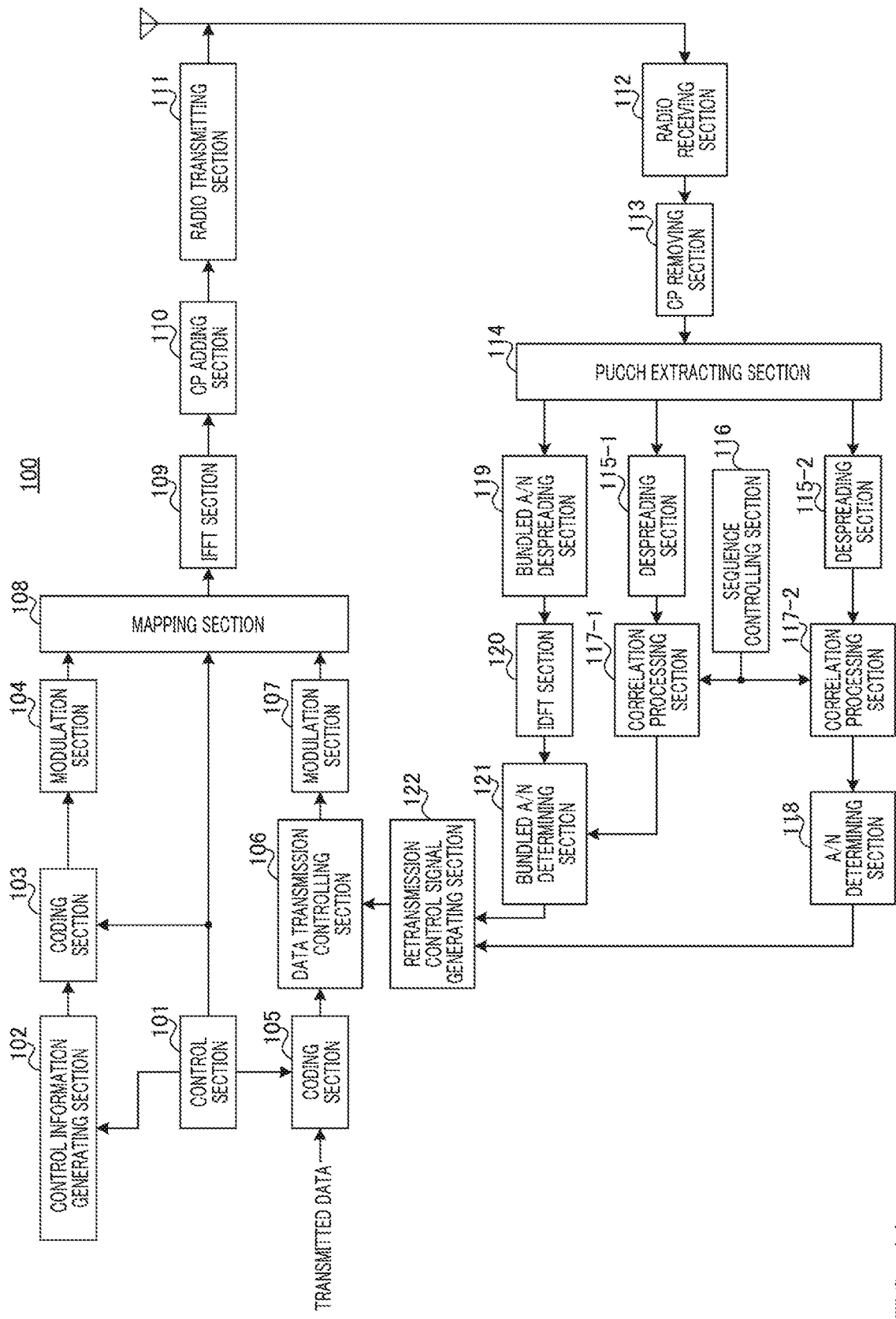
FIG. 11 is a block diagram showing the configuration of a base station according to Embodiment 1 of the present disclosure.

FIG. 11 is a configuration diagram of base station 100 according to Embodiment 1 of the present disclosure. In FIG. 11, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PUCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)".

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. Data transmission controlling section 106 keeps the coded transmission data for each destination terminal 200. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109. CP adding section 110 adds a CP to the transformed signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously reported to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously reported to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously reported to terminal 200.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence control section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data (downlink data) transmitted in the downlink component carrier, and generates a retransmission control signal on the basis of the result of determination. This determination is performed on the basis of information received from bundled A/N determining section 121, information received from A/N determining section 118, and reporting timing information of the error detection result. The reporting timing information of the error detection result is determined according to the combination of a plurality of UL-DL Configurations and subframe timings set in advance between base station 100 and terminal 200. To put it more specifically, when determining that downlink data transmitted on a certain downlink component carrier needs to be retransmitted, retransmission control signal generating section 122 generates a retransmission control signal indicating a retransmission command for the downlink data and outputs the retransmission control signal to data transmission controlling section 106. In addition, when determining that the downlink data transmitted on a certain downlink component carrier does not need to be retransmitted, retransmission control signal generating section 122 generates a retransmission control signal indicating not to retransmit the downlink data transmitted on the downlink component carrier and outputs the retransmission control signals to data transmission controlling section 106. In addition, details of the reporting timing information of the error detection result for the combination of a plurality of UL-DL Configurations and subframe timing, which is used when retransmission control signal generating section 122 determines whether or not to retransmit data, will be described later.

[Configuration of Terminal]

Figure 12:
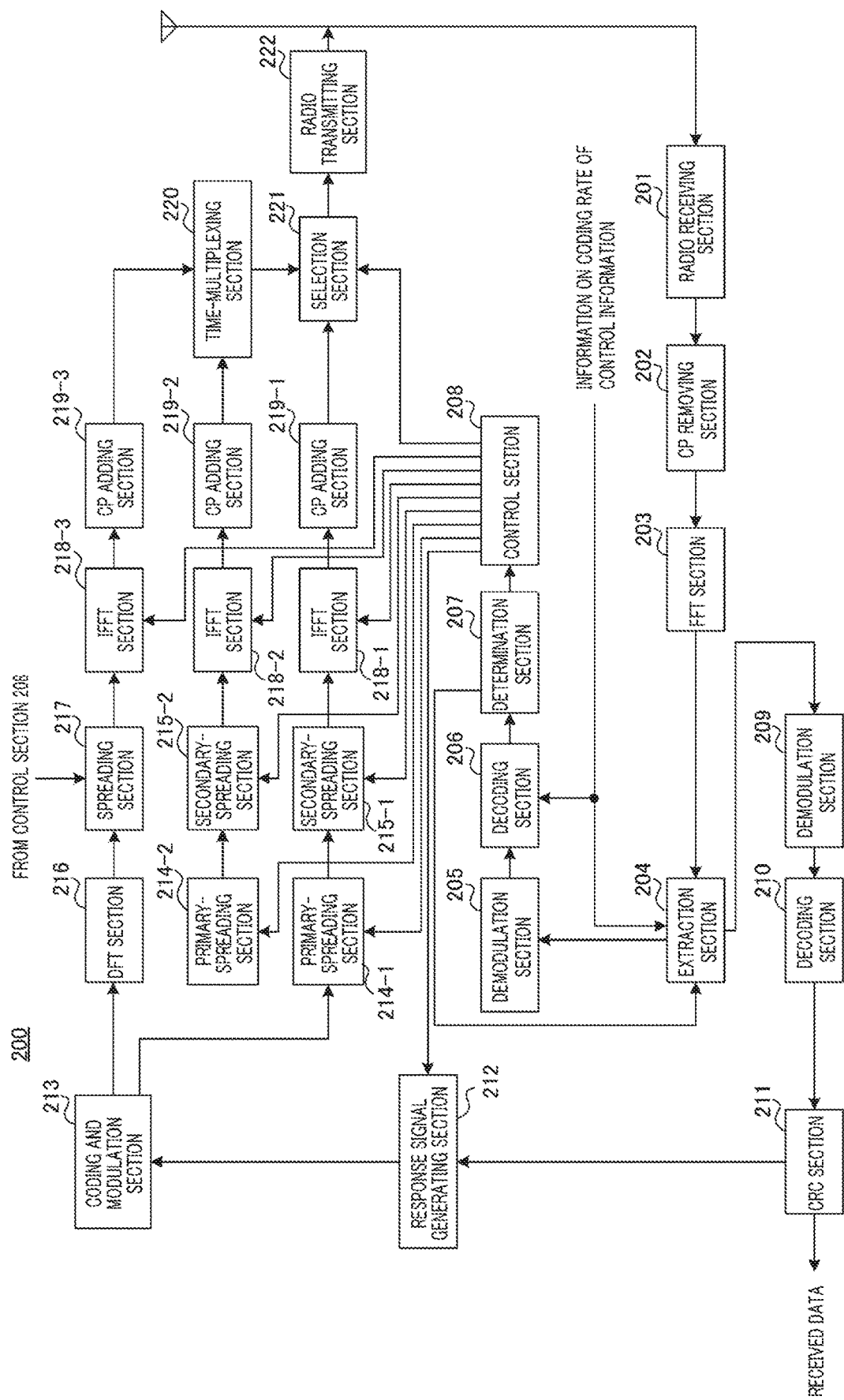
FIG. 12 is a block diagram showing the configuration of the terminal according to Embodiment 1 of the present disclosure.

FIG. 12 is a block diagram illustrating a configuration of terminal 200 according to Embodiment 1. In FIG. 12, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. To put it more specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously reported by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously reported by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource. The method of determining the A/N resource (i.e., PUCCH resource) in control section 208 will be described in detail, hereinafter.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates a response signal on the basis of the reporting timing information of the error detection result and the receiving conditions of downlink data in each downlink component carrier (result of error detection on downlink data) received from CRC section 211. Here, the reporting timing information of the error detection result is determined according to the combination of a plurality of UL-DL Configurations and subframe timing set in advance between base station 100 and terminal 200. To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213. In addition, details of the reporting timing information of the error detection result for the combination of a plurality of UL-DL Configurations and subframe timing, which is used in response signal generating section 212, will be described later.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

Primary-spreading sections 214-1 and 214-2 corresponding to the A/N resource and the reference signal resource of bundled ACK/NACK resource spread ACK/NACK signals or reference signals using a base sequence corresponding to the resource in accordance with an instruction from control section 208 and outputs the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource. Then, time-multiplexing section 220 outputs the multiplexed signals to selection section 221.

Selection section 221 selects one of the bundled ACK/NACK resource received from time-multiplexing section 220 and the A/N resource received from CP adding section 219-1 in accordance with an instruction from control section 208 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Next, operations of base station 100 and terminal 200 having the above configuration will be described. Hereinafter, for the following explanation, setting in which different UL-DL Configurations are set for the component carriers of the PCell and SCell is called "2CC-different Config setting." In addition, setting in which the same UL-DL Configuration is set for the component carriers of the PCell and SCell is called "2CC-same Config setting." In addition, a case where only a single component carrier (1 CC) is configured for terminal 200 and the same UL-DL Configuration as for the SCell to be compared with the single component carrier is set for the single component carrier component carrier is called "1CC-SCell Config setting."

In Embodiment 1, in the case of 2CC-different Config setting, terminal 200 always reports a result of error detection on the downlink data, which is received in the component carrier of the SCell, in the subframe #2 or subframe #7 of the component carrier of the PCell. That is, in Embodiment 1, in the case of 2CC-different Config setting, a timing at which the result of error detection on the downlink data of the SCell is reported is not the same as a timing at which the result of error detection on the downlink data received in the same subframe is reported in the 1CC-SCell Config setting.

In addition, in the 2CC-same Config setting, terminal 200 reports a result of error detection on the downlink data of the SCell in the component carrier of the PCell at the same timing as the reporting timing in the 1CC-SCell Config setting. In other words, in the present embodiment, the reporting timing of the result of error detection on the downlink data of the SCell in the case of 2CC-different Config setting is not the same as that in the case of 2CC-same Config setting.

Figure 3:
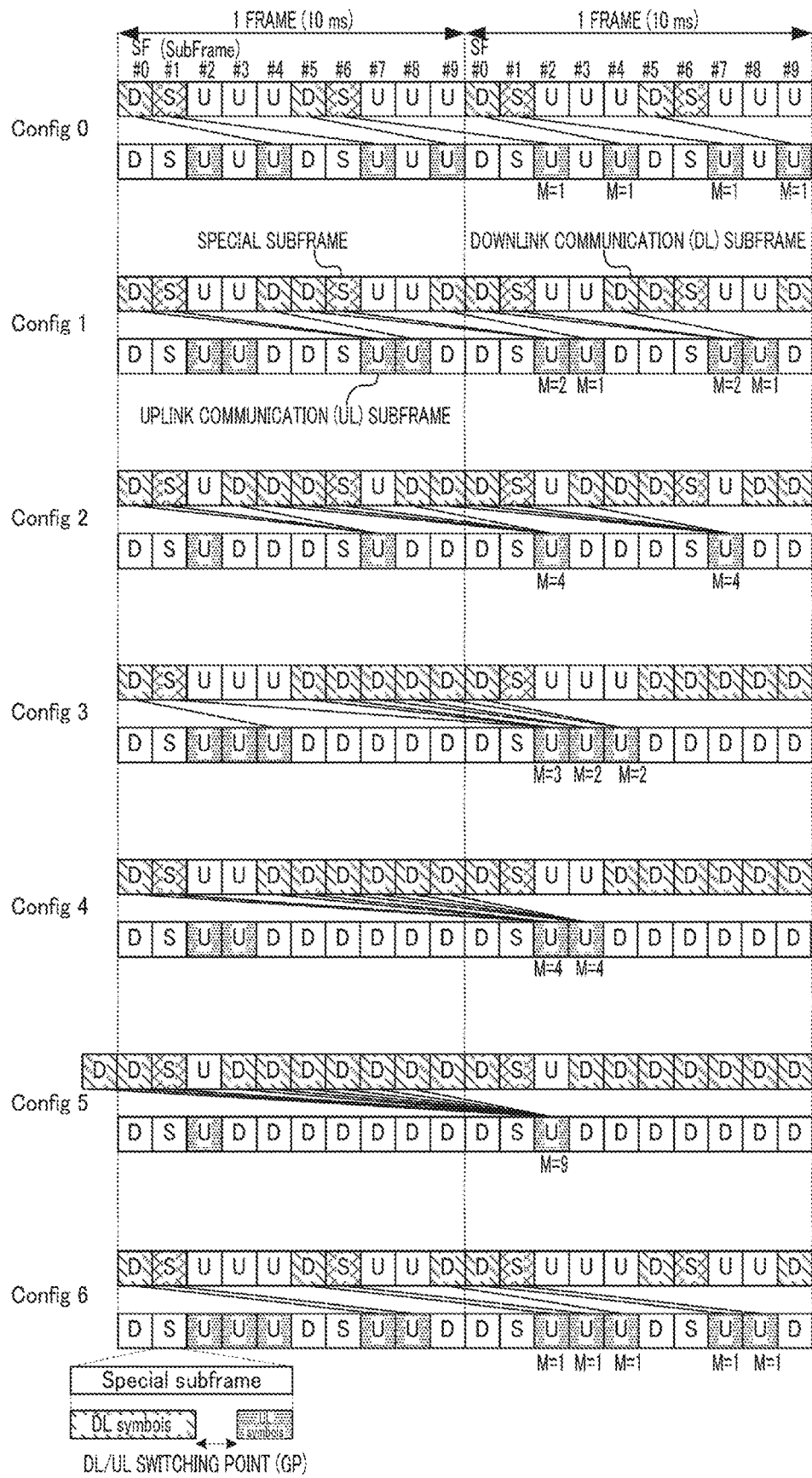
FIG. 3 is a diagram provided for describing the UL-DL Configuration in TDD.
Figure 4:
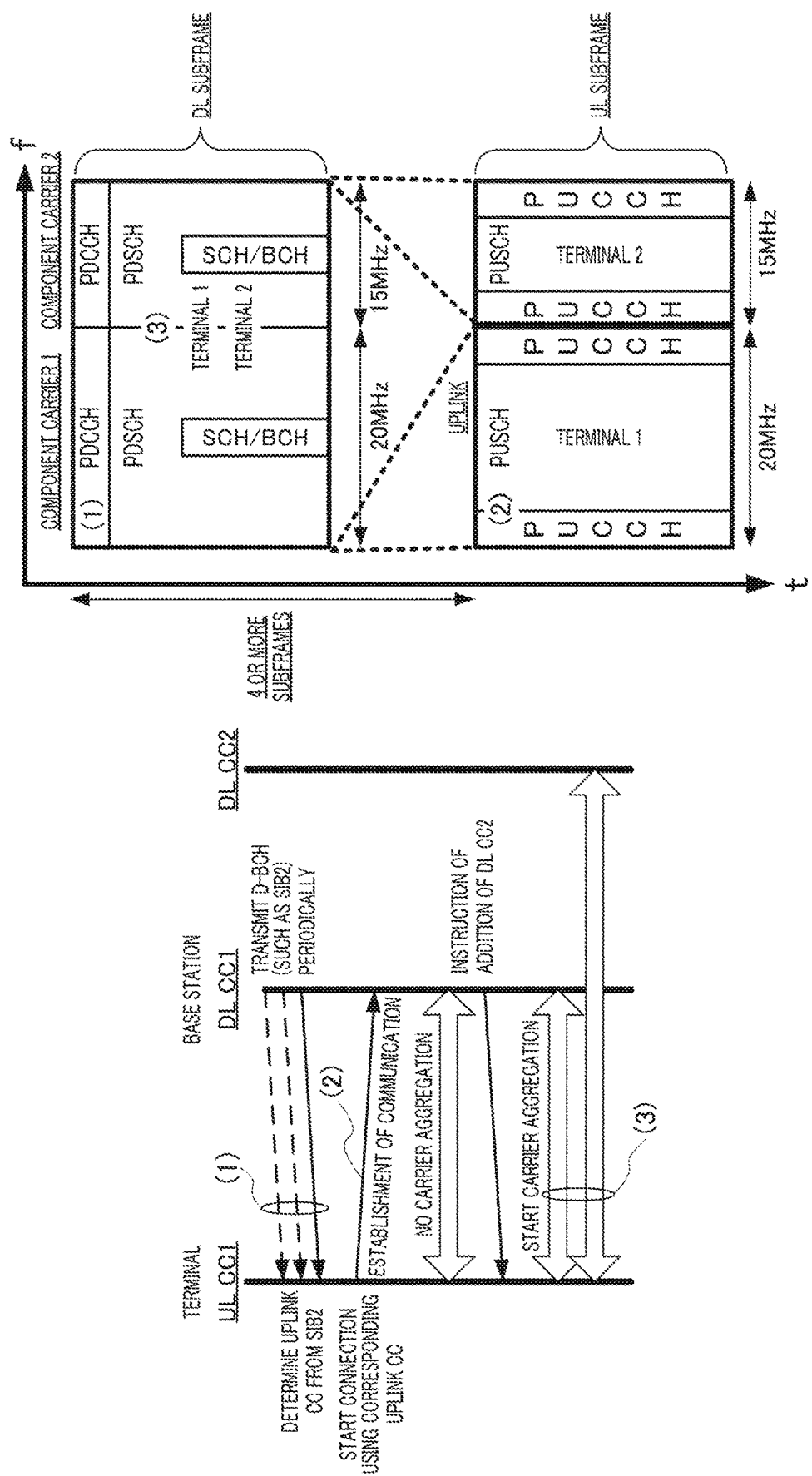
FIGS. 4A and 4B are diagrams provided for describing asymmetric carrier aggregation and a control sequence applied to individual terminals.
Figure 5:
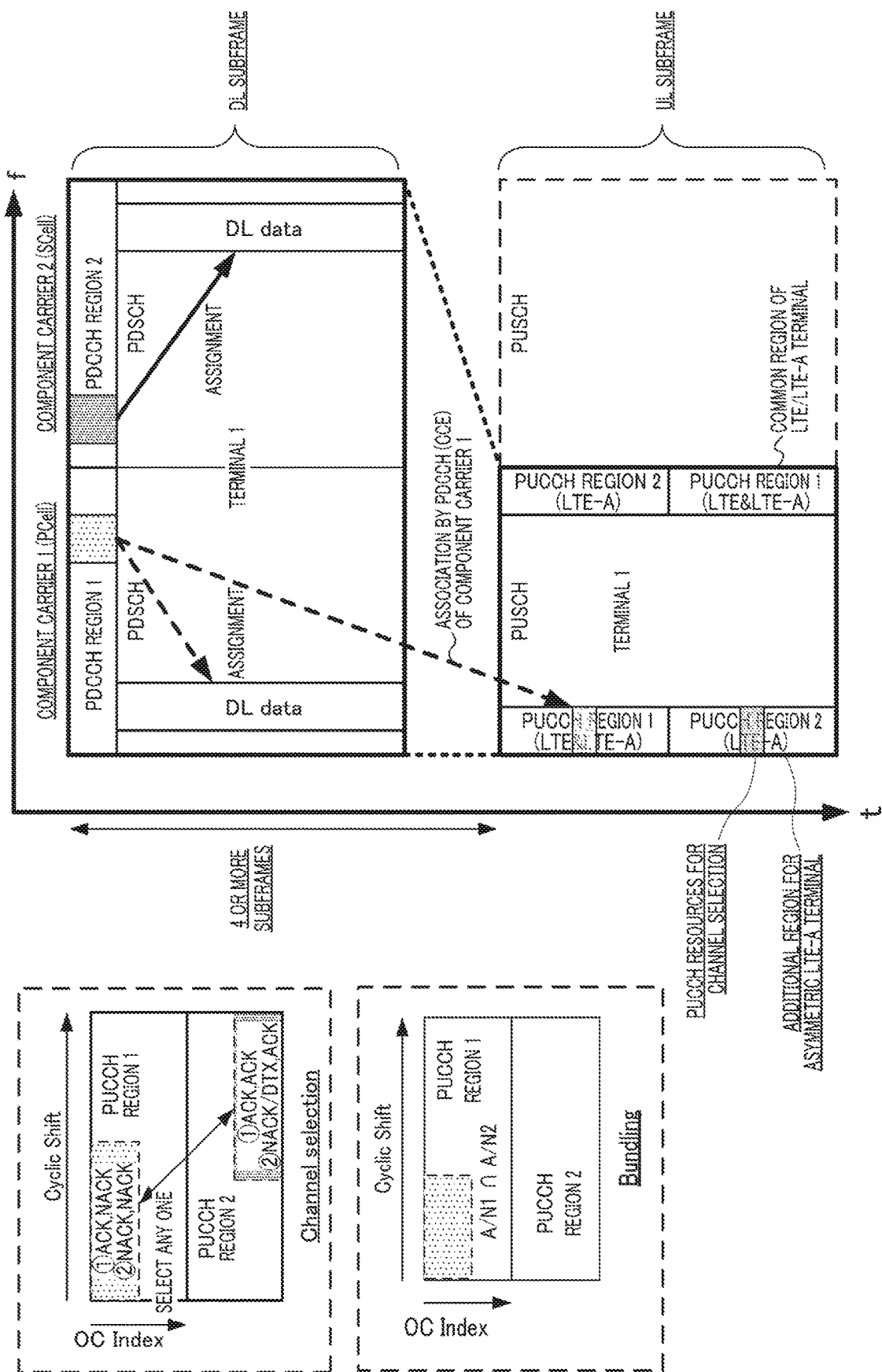
FIG. 5 is a diagram provided for describing Channel Selection.

As shown in FIG. 3, a special subframe includes a DL/UL switching point (also referred to as a Guard Period (GP)). In Config 0, Config 1, Config 2, and Config 6, the DL/UL switching point appears at periods of 5 ms. In addition, in Config 3, Config 4, and Config 5, the DL/UL switching point appears at periods of 10 ms. Hereinafter, the UL-DL Configuration in which a minimum period, in which the special subframe appears periodically, is a 5 ms period is called "UL-DL Configuration of 5 ms period." In addition, the UL-DL Configuration in which a minimum period, at which the special subframe appears periodically, is a 10 ms period is called "UL-DL Configuration of 10 ms period."

The reason why two types of periods are present is to allow various ratios of UL subframes and DL subframes (and special subframes) to be set. The ratio of UL subframes and DL subframes (and special subframes) is 6:4 in the case of Config 0, 5:5 in the case of Config 6, 4:6 in the case of Config 1, 3:7 in the case of Config 3, 2:8 in the case of Config 2, and 1:9 in the case of Config 5. The DL/UL switching point in each UL-DL Configuration is always present in the subframe #1 in the UL-DL Configuration of 5 ms period. In addition, in the UL-DL Configuration of 10 ms period, the DL/UL switching point is always present in the subframe #1 and the subframe #6. Thus, by setting the DL/UL switching point at the same timing for a plurality of UL-DL Configurations, base station 100 and terminal 200 can perform determination regarding the special subframe with a fewer number of divided cases. Here, since the DL/UL switching point is included in the special subframe as described above, the next subframe of the special subframe necessarily becomes the UL subframe in all UL-DL Configurations. That is, in cases of Config 0, Config 1, Config 2, and Config 6, the subframe #2 and the subframe #7 necessarily become UL subframes. In the UL-DL Configuration of 10 ms period (Config 3, Config 4, and Config 5), the subframe #2 necessarily becomes the UL subframe.

Therefore, in the present embodiment, when the UL-DL Configuration of 10 ms period is set for the component carrier of the PCell, terminal 200 reports the result of error detection on the downlink data of the SCell in the subframe #2. The subframe #2 is a UL subframe common to all UL-DL Configurations. In addition, when the UL-DL Configuration of 5 ms period is set for the component carrier of the PCell, terminal 200 reports the result of error detection on the downlink data of the SCell in the subframe #2 and the subframe #7.

Figure 8A:
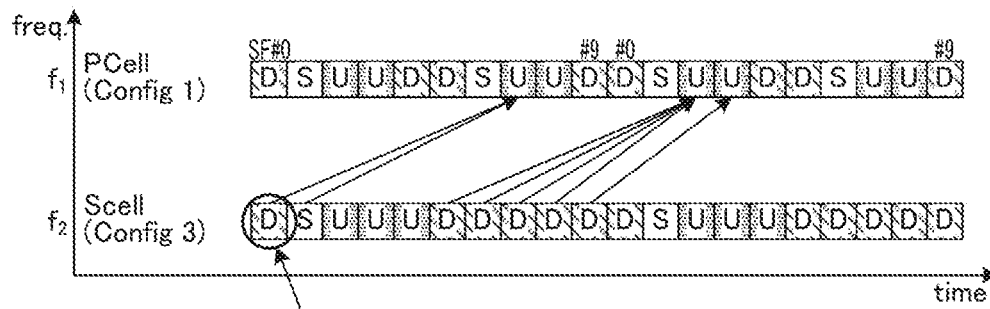
FIGS. 8A to 8D are diagrams showing the reporting timings of a response signal when different UL-DL Configurations are set for an SCell and a PCell.
Figure 8B:
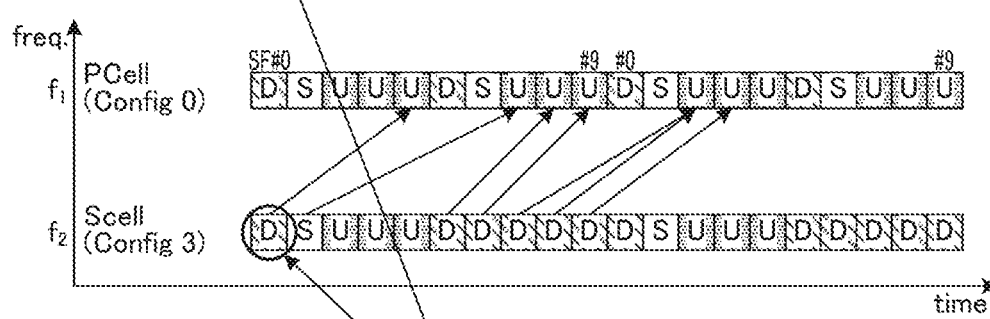
Figure 8C:
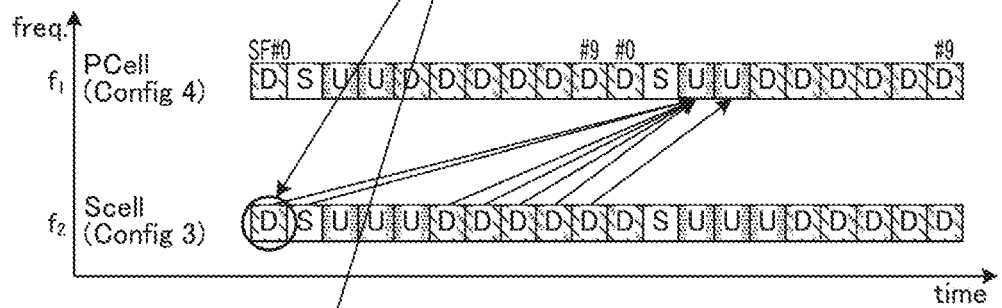
Figure 8D:
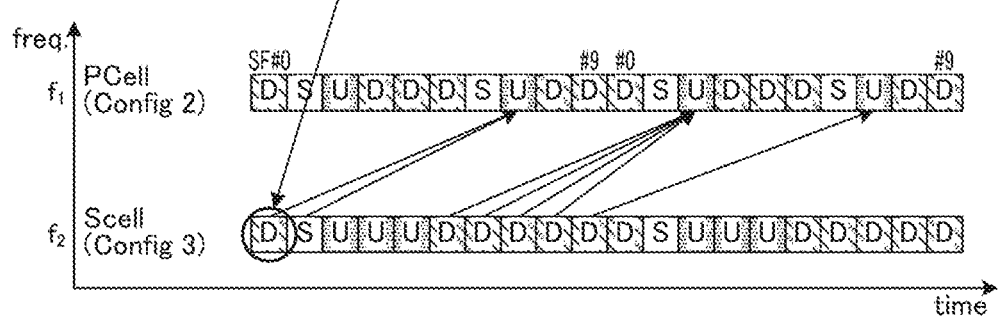

FIGS. 13A to 13D show diagrams illustrating the reporting timing of the result of error detection on the downlink data of the SCell according to Embodiment 1. FIG. 13A shows an example where Config 1 is set for the PCell and Config 3 is set for the SCell, as in FIG. 8A. The examples shown in FIGS. 13B, 13C, and 13D are examples where Config 0, Config 4, and Config 2 are set in this sequence for the PCell and Config 3 is set for the SCell as in FIG. 13A. Here, referring to the subframe #0, terminal 200 reports the result of error detection on the downlink data, which is received in the SCell, in a subframe of the earliest timing among subframes set for reporting. In this case, it takes at least 4 ms (time required to generate a response signal including an error detection result) until terminal 200 reports the error detection result from the reception of the downlink data. For this reason, terminal 200 reports the result of error detection on the downlink data in the subframe #2 or the subframe #7 of the earliest timing after 4 ms from the reception of the downlink data. That is, when the UL-DL Configuration of 5 ms period is set for the PCell as in FIG. 13A, 13B, or 13D, terminal 200 reports the error detection result in the subframe #7 that appears next. When the UL-DL Configuration of 10 ms period is set for the PCell as in FIG. 13C, terminal 200 reports the error detection result in the subframe #12 of the earliest timing after 4 ms from the reception (subframe #2 of the next frame).

Thus, when different UL-DL Configurations are set for the PCell and SCell, terminal 200 limits the timing, at which the error detection result is reported in the PCell, to the subframe #2 or the subframe #7. In all combinations of the UL-DL Configurations set for the PCell and the SCell and the subframe number of the SCell in which terminal 200 receives downlink data, the above reporting timing is limited to the subframe #2 or the subframe #7. That is, the reporting timings of the error detection result are not complicatedly dispersed depending on the conditions. Therefore, base station 100 and terminal 200 can simplify and perform the processing regarding the error detection result. In addition, the number of test cases in the development stage of base station 100 and terminal 200 is reduced.

FIGS. 14A to 14G show data tables showing the reporting timings of the error detection result according to the combination of UL-DL Configurations of two cells (PCell and SCell) and subframe numbers to receive the downlink data in Embodiment 1. As in FIGS. 9A to 9G, FIGS. 14A to 14G show in which subframe of the PCell the result of error detection on the downlink data received in a certain downlink subframe of the SCell is reported when a certain UL-DL Configuration is set for the SCell. In addition, FIGS. 14A to 14G show the reporting timings when the same UL-DL Configuration is set for two cells using shaded diagonal lines.

For example, as shown in FIG. 14D, when the SCell is Config 3 and the UL-DL Configuration of the PCell is different from the UL-DL Configuration of the SCell (that is, other than Config 3), the reporting timings are as follows. That is, the reporting timing of the result of error detection on the received data in the subframe #0 of the SCell is the subframe #7 when the PCell is the UL-DL Configuration of 5 ms period. When the PCell is the UL-DL Configuration of 10 ms period, the reporting timing is the subframe #12 (that is, a subframe #2 of the next frame).

In addition, the reporting timing of the result of error detection on the received data in the subframe #9 of the SCell is the subframe #17 (that is, subframe #7 of the next frame) when the PCell is the UL-DL Configuration of 5 ms period. When the PCell is the UL-DL Configuration of 10 ms period, the reporting timing is the subframe #22 (that is, a subframe #2 of a frame located ahead by two frames).

In addition, the result of error detection on the received data in the subframe #5 of the SCell is the subframe #12 (that is, a subframe #2 of the next frame) when the PCell is the UL-DL Configuration of 5 ms period. Also when the PCell is the UL-DL Configuration of 10 ms period, the reporting timing is the subframe #12 (that is, a subframe #2 of the next frame).

Figure 15:
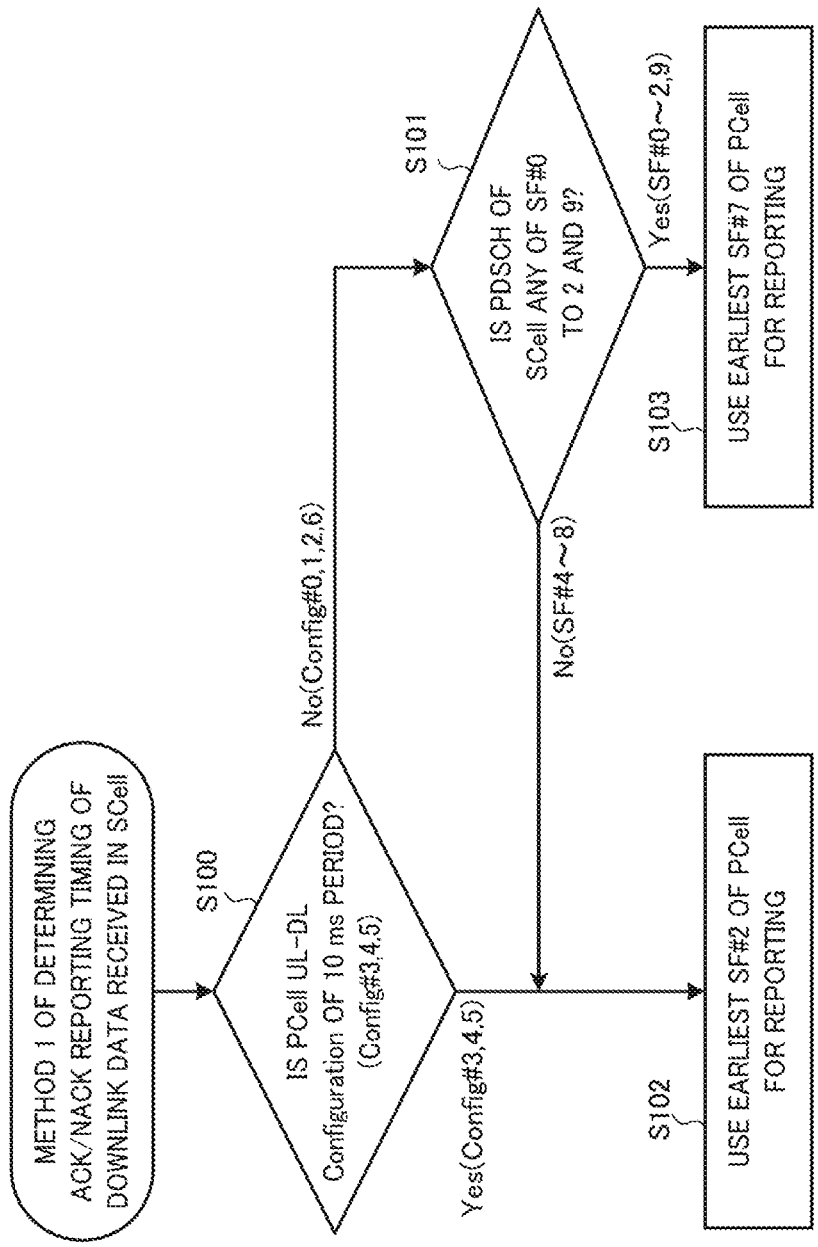
FIG. 15 is a flow chart illustrating a method of determining the reporting timing of a response signal according to Embodiment 1 of the present disclosure.

FIG. 15 shows a flow chart illustrating a method of determining the reporting timing of the error detection result according to Embodiment 1. This determination flow is based on the assumption that different UL-DL Configurations are set for the PCell and the SCell. The reporting timings of the error detection result (ACK/NACK) according to Embodiment 1 described above can be calculated by the determination flow in FIG. 15. That is, when determining the reporting timing, it is first determined whether the UL-DL Configuration of the PCell includes a 10 ms period (minimum period in which the special subframe appears periodically) or a 5 ms period (S100). When the determination result is a 10 ms period, the reporting timing is determined to be the earliest subframe (SF) #2 of the PCell (S101). When the determination result is a 5 ms period, the subframe number of the PDSCH in which the downlink data of the SCell has been transmitted is then determined (S101). As a result, when the subframe numbers are "#0 to #2 and #9," the reporting timing is determined to be the earliest subframe #7 of the PCell (S103). When the subframe numbers are "#4 to #8", the reporting timing is determined to be the earliest subframe #2 of the PCell (S101).

When the same UL-DL Configuration is set for the PCell and the SCell, terminal 200 adopts the reporting timing of the error detection result set in the case of 1 CC.

In the present embodiment, control section 208 (refer to FIG. 10) of terminal 200 may determine the reporting timing of the error detection result by executing the determination flow shown in FIG. 15. Alternatively, control section 208 of terminal 200 may store in a memory, table data, which indicates the reporting timings determined by the determination flow shown in FIG. 15, and control section 208 may determine the reporting timing of the error detection result by reading the table data.

In the transmission and reception method of Embodiment 1, focus is given to the following situation and timing. That is, focus is given to the timing when 4 ms required to generate a result of error detection on the downlink data elapses after different UL-DL Configurations are set for the PCell and the SCell and terminal 200 receives the downlink data in the SCell. In this case, when the SCell is a UL subframe and the PCell is a DL subframe, terminal 200 cannot report the error detection result in the PCell at the same timing as in the 1CC-SCell Config setting. However, control section 208 of terminal 200 of the present embodiment 1 can also determine the reporting timing of the result of error detection on the downlink data easily in such a case. In addition, terminal 200 reports the error detection result in a period of the subframe number that is common to a plurality of UL-DL Configurations, that is, in the next subframe #2 (next subframe #2 or #7 in the UL-DL Configuration of 5 ms period) of the PCell. Therefore, error detection result transmission processing in terminal 200 and error detection result receiving processing in base station 100 are simplified.

Embodiment 2

In Embodiment 2, terminal 200 reports the result of error detection on downlink data, which is received in a component carrier of the SCell, in the PCell at the following timing. That is, when the 1CC-SCell Config setting is applied to the downlink data of the SCell, if a subframe of the PCell is a UL subframe in a period of reporting timing, terminal 200 reports the error detection result in the UL subframe. In the 1CC-SCell Config setting, when the subframe of the PCell in a period of reporting timing is a DL subframe, terminal 200 reports the error detection result at the same timing as in Embodiment 1. That is, in the latter case, if the UL-DL Configuration of 10 ms period is set for the PCell, terminal 200 reports the error detection result in the subframe #2 that appears next earliest timing. In addition, if the UL-DL Configuration of 5 ms period is set for the PCell, terminal 200 reports the error detection result in the subframe #2 or #7 that appears next earliest timing.

As shown in FIG. 3, among a plurality of UL-DL Configurations, there is a combination of a plurality of UL-DL Configurations having a UL subframe at the same timing other than the subframe #2 and the subframe #7. For example, the subframe #3 of Config 0, Config 1, Config 3, Config 4, and Config 6 is a UL subframe. Therefore, the following can be said when these UL-DL Configurations are set for the SCell and the PCell. That is, in this case, terminal 200 can report the result of error detection on downlink data of the Scell, in which the subframe #3 is a reporting timing, in the PCell at this reporting timing if the 1CC-SCell Config setting is applied. The same applies to a case where different UL-DL Configurations are set for the SCell and the PCell among Config 0, Config 1, Config 3, Config 4, and Config 6. That is, when the above-described conditions are satisfied, terminal 200 can report the result of error detection on the downlink data, which is received in the SCell, in the PCell using the reporting timing in the case of 1 CC. In addition, such reporting timing is a timing common to a plurality of UL-DL Configurations, and the reporting timings are not complicatedly dispersed by the combination of UL-DL Configurations. In such a case, therefore, the need for making the reporting timing of the above-described error detection result different from the reporting timing in the 1CC-SCell Config setting is reduced.

On the other hand, when Config 2 or Config 5 is set for the PCell, the subframe #3 of the PCell is a DL subframe. In this case, therefore, terminal 200 cannot report the result of error detection on the downlink data of the SCell for which the subframe #3 is a reporting timing, in the PCell at this reporting timing if the 1CC-SCell Config setting is applied. In such a case, therefore, terminal 200 needs to make the reporting timing of the above-described error detection result different from the reporting timing in the 1CC-SCell Config setting.

FIGS. 16A to 16G show data tables showing the reporting timings of the error detection result according to the combination of UL-DL Configurations of two cells (PCell and SCell) and subframe numbers to receive the downlink data in the SCell in Embodiment 2. Specifically, as in FIGS. 9A to 9G or FIGS. 14A to 14G, FIGS. 16A to 16G show in which subframe of the PCell the result of error detection on the downlink data, which is received in a certain downlink subframe of the SCell, is reported when a certain UL-DL Configuration is set for the SCell. In addition, in FIGS. 16A to 16G, the reporting timing when the same UL-DL Configuration is set for two cells is shown by shaded diagonal lines, and the same reporting timing as in the 1CC-SCell Config setting is shown by shaded dots.

For example, as shown in FIG. 16D, the reporting timing of the error detection result in Embodiments 1 and 2 is different when the UL-DL Configuration of the PCell is #0 or #6 and the subframe of the SCell in which downlink data is received is #7, #8, or #9. The reporting timings in Embodiment 1 are subframes #12 and #17, but the reporting timings in Embodiment 2 are subframes #13 and #14. The reporting timings of the subframes #13 and #14 are the same as the reporting timing when the UL-DL Configuration of the PCell and the UL-DL Configuration of the SCell are the same.

Figure 17:
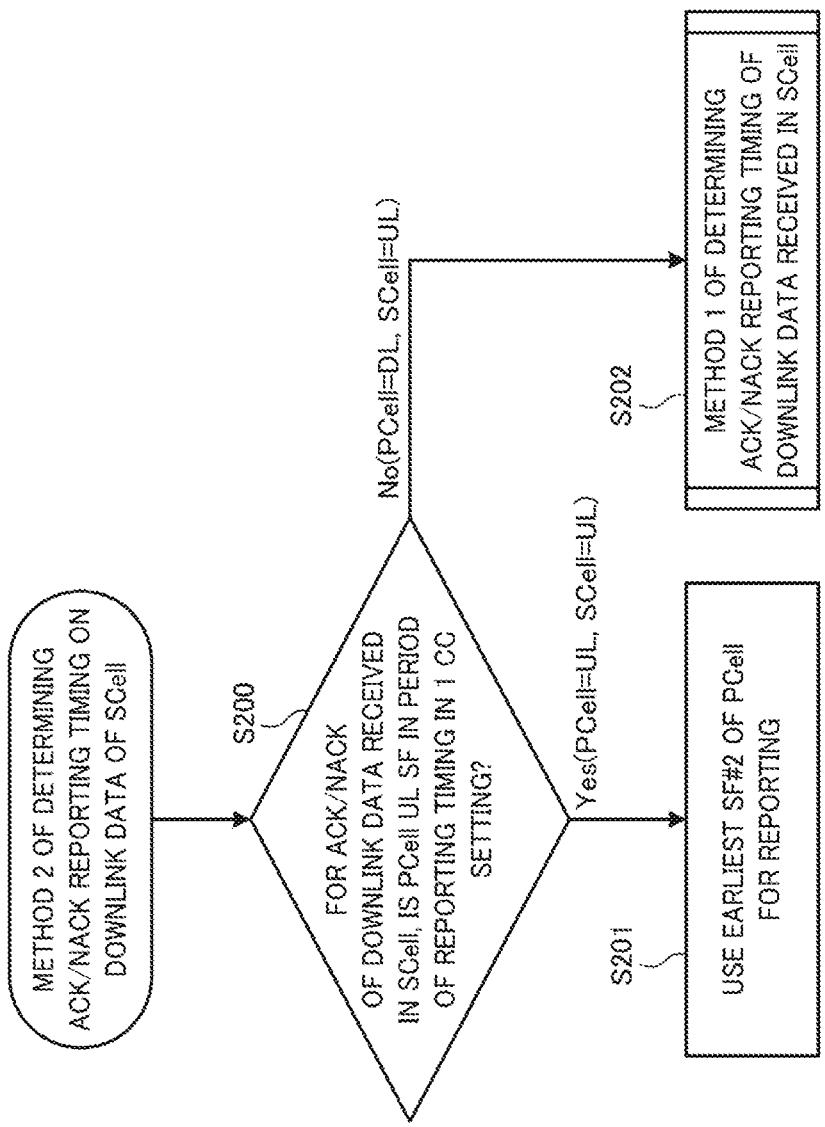
FIG. 17 is a flow chart illustrating a method of determining the reporting timing of a response signal according to Embodiment 2 of the present disclosure.

FIG. 17 shows a flow chart illustrating a method of determining the reporting timing of the error detection result according to Embodiment 2. This determination flow is based on the assumption that different UL-DL Configurations are set for the PCell and the SCell. When determining the reporting timing, it is first determined, for the result of error detection on the downlink data of the SCell, whether or not the PCell is a UL subframe (UL SF) in a period of reporting timing in the 1CC-SCell Config setting (S200). If the determination result is a UL subframe, the reporting timing of the error detection result described above is determined to be the UL subframe of the PCell (S201). On the other hand, if the determination result is not a UL subframe, the reporting timing of the error detection result described above is determined according to the determination method shown in FIG. 15 (S202). The reporting timing of the error detection result (ACK/NACK) according to Embodiment 2 shown in FIG. 16 is calculated by this determination flow.

In Embodiment 2, control section 208 (refer to FIG. 10) of terminal 200 may determine the reporting timing of the error detection result by executing the determination flow shown in FIG. 15. Alternatively, control section 208 of terminal 200 may store in a memory, table data, which indicates the reporting timing determined by the determination flow shown in FIG. 17, and control section 208 may determine the reporting timing of the error detection result by reading the table data.

According to the transmission/reception method according to Embodiment 2, when different UL-DL Configurations are set for the PCell and the SCell, terminal 200 reports the result of error detection on the downlink data of the SCell in the PCell. In this case, the reporting timing of the error detection result in the PCell is determined according to the combination of the number of the UL-DL Configuration set for each of the PCell and the SCell and the number of the subframe to receive the downlink data in the SCell. In Embodiment 2, the reporting timing of the error detection result in the PCell is limited to the subframe #2 or the subframe #7 in some of the combinations described above. The number of combinations of the numbers of the UL-DL Configurations set for the PCell and the SCell is 49 (=7×7), and the subframe number to receive the downlink data in the SCell is 9 at the maximum (in the case of Config 5). Therefore, the number of combinations of these is very large. However, since the reporting timing of the error detection result according to each combination is limited to the subframe #2 or subframe #7 in many cases, the reporting timings are not complicatedly dispersed. Therefore, error detection result transmission processing in terminal 200 and error detection result receiving processing in base station 100 are simplified. In addition, the number of test cases in the development stage of terminal 200 and base station 100 is reduced.

In addition, according to the transmission and reception method according to Embodiment 2, when reporting the result of error detection on the downlink data, which is received in the SCell, in the PCell, terminal 200 reports the error detection result in the PCell at the same reporting timing as in the case of 1CC-SCell Config setting if possible. That is, a situation where the actual error detection result reporting timing is shifted from the reporting timing in the case of 1CC-SCell Config setting is minimized. That is, even if different UL-DL Configurations are set for the PCell and the SCell, changes in the content (such as timings) of error detection result reporting processing are reduced compared with that in cases of 1CC-SCell Config setting and 2CC-same Config setting. Therefore, error detection result transmission processing in terminal 200 and error detection result receiving processing in base station 100 are the same as that in the case of 1CC-SCell Config setting or 2CC-same Config setting. Thus, the number of test cases in the development stage of terminal 200 and base station 100 is reduced.

Embodiment 3

In the case of 2CC-same Config setting, terminal 200 of Embodiment 3 always reports the result of error detection on the downlink data, which is received in the component carrier of the SCell, in the PCell regardless of the presence or absence of uplink data (PUSCH) transmission in the component carrier of the SCell. Specifically, terminal 200 reports this error detection result in the PUSCH region or PUCCH region of the PCell. In addition, in the case of 2CC-different Config setting, terminal 200 always reports the result of error detection on the downlink data, which is received in the component carrier of the SCell, in the PCell regardless of the presence or absence of uplink data (PUSCH) transmission in the component carrier of the SCell.

In Embodiments 1 and 2, the reporting timing of the result of error detection on the downlink data received in the SCell in the case of 2CC-different Config setting is different from the timing as a reporting timing of the error detection result in the 1CC-SCell Config setting. Alternatively, in another expression, the timing at which terminal 200 reports the result of error detection on the data received in the component carrier of the SCell is different between the case of 2CC-same Config setting and the case of 2CC-different Config setting. Next, the operations of base station 100 and terminal 200 according to Embodiment 3 in a case where there is uplink data transmission in the SCell and a case where there is no uplink data transmission in the SCell when the reporting timing of the error detection result is different as described above will be described.

In LTE-Advanced Release 10, for the terminal, the same UL-DLConfiguration is set for the component carrier of the PCell and the component carrier of the SCell. In addition, the terminal reports the result of error detection on the downlink data, which is received in the PCell, and the result of error detection on the downlink data, which is received in the SCell, in the uplink control channel (PUCCH) region of the PCell in the UL subframe. Here, in the UL subframe, when the terminal transmits the uplink data in the SCell, the terminal reports the error detection result as follows. That is, the terminal reports the uplink data of the SCell together with the result of error detection on the downlink data, which is previously received in the PCell, and the result of error detection on the downlink data, which is previously received in the SCell, in the uplink data channel (PUSCH) region of the SCell. Such transmission in a single channel is performed in order to maintain the single carrier characteristics of low PAPR (Peak-to-Average Power Ratio) in uplink transmission.

Figure 18:
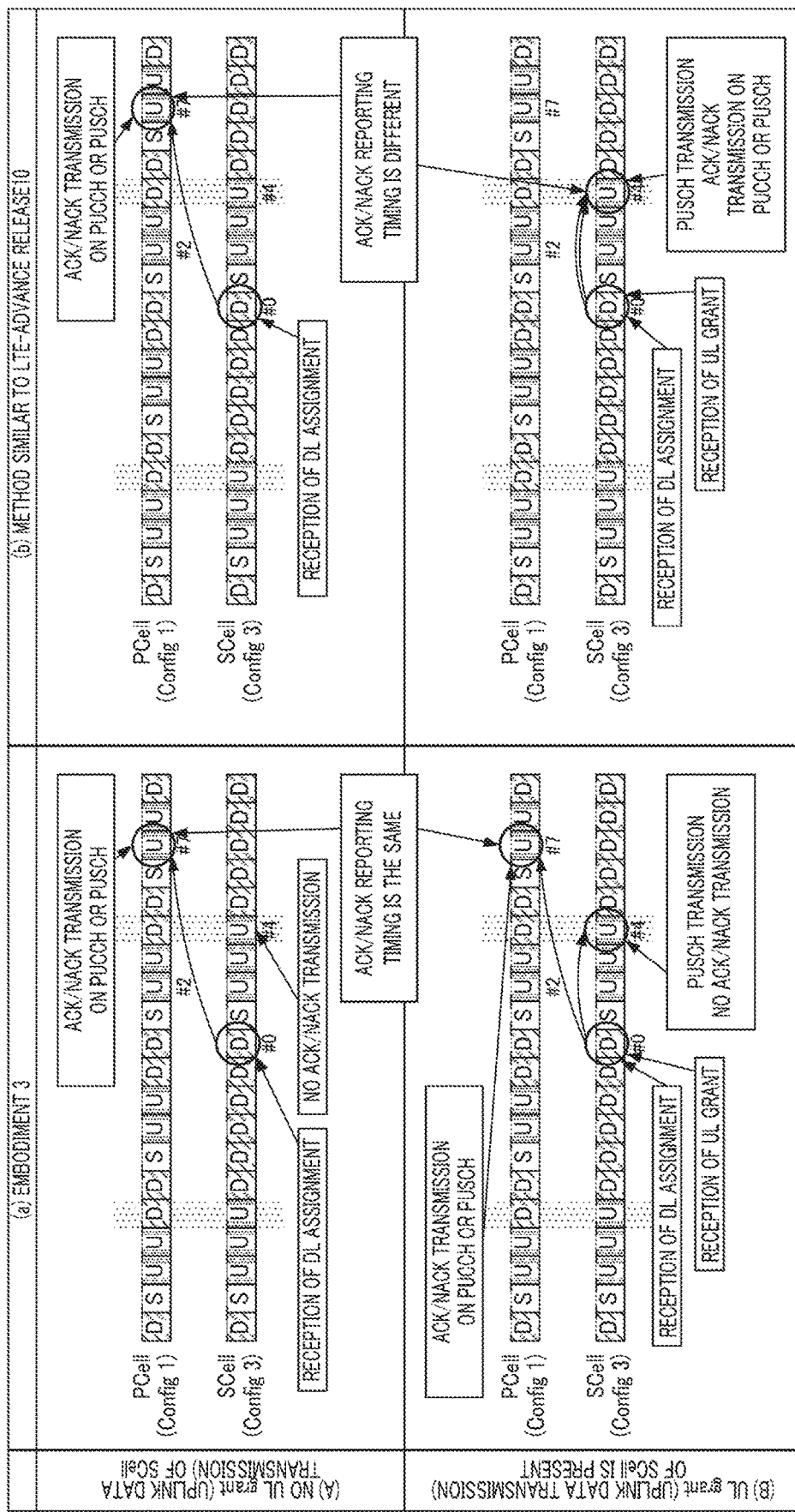
FIG. 18 is a diagram illustrating the reporting timings of a response signal according to the presence or absence of UL grant according to Embodiment 3 of the present disclosure and the reporting timings according to the presence or absence of UL grant that is similar to the specification in the related art.

FIG. 18 is a diagram explaining the reporting timing of the result of error detection according to the presence or absence of uplink data transmission in the SCell by comparing a method (a) according to Embodiment 3 with a method (b) similar to LTE-Advanced Release 10. FIG. 18 shows a case where different UL-DL Configurations are set for the component carriers of the PCell and SCell. However, the same is true for a case where the same UL-DL Configuration is set for the component carriers of the PCell and SCell. The row of (A) in FIG. 18 shows a case where there is no UL grant (control information to assign resources for uplink data for a designated UL subframe of the SCell in the terminal) of the SCell, that is, there is no uplink data transmission. The row of (B) shows a case where there is a UL grant of the SCell, that is, there is uplink data transmission.

In the example shown in FIG. 18, base station 100 indicates DL assignment (control information to assign resources of downlink data) of the SCell to terminal 200 in the subframe #0, and terminal 200 receives downlink data in the subframe. In the example of (A) row, since the UL grant of the SCell is not indicated, terminal 200 reports the result of error detection on the downlink data, which is received in the subframe #0 of the SCell, in the subframe #7 of the PCell. If the resources of uplink data are assigned for the PCell when the error detection result is reported, terminal 200 reports the error detection result in the PUSCH region of the PCell. On the other hand, if the resources of uplink data are not assigned for the PCell, terminal 200 reports the error detection result in the PUCCH region of the PCell.

In contrast, in the example of (B) row, base station 100 indicates the UL grant of the SCell to terminal 200 in subframe #0, and assigns the resources of the PUSCH region of the subframe #4 of the SCell to terminal 200 for transmission of uplink data. In this case, in the (b) method similar to LTE-Advanced Release 10, the terminal reports the result of error detection on the downlink data, which is received in the subframe #0 of the SCell, in the PUSCH region of the subframe #4 of the SCell. However, base station 100 cannot check whether or not the DL assignment and the UL grant indicated to the terminal have been correctly received by the terminal. Therefore, base station 100 should take into consideration a case where the terminal fails to receive the DL assignment and the UL grant. Specifically, in the method of (b), base station 100 needs to check in which of the following 1, 2, and 3 the result of error detection on the downlink data, which is received in the subframe #0 of the SCell, is reported. 1. PUSCH region of subframe #4 shown in (B)-(b). 2. PUCCH region of subframe #7 of PCell shown in (A)-(b). 3. PUSCH region of subframe #7 of PCell shown in (A)-(b). Thus, in the (b) method similar to LTE-Advanced Release 10, base station 100 needs to check the result of error detection on certain downlink data over a plurality of component carriers and a plurality of timings. For this reason, error detection result decoding processing in base station 100 becomes complicated.

Therefore, in the method of the present Embodiment 3 shown in (a) of FIG. 18, even if the UL grant is reported in the SCell and the uplink data is transmitted in the PUSCH region of the SCell, terminal 200 always reports the error detection result of the SCell in the PCell. A specific example of this reporting is shown in (B)-(a) of FIG. 18. That is, base station 200 reports the UL grant of the SCell to terminal 100 in the subframe #0, and terminal 100 transmits the uplink data in the PUSCH region of the subframe #4 of the SCell. In addition, also in this case, terminal 200 reports the result of error detection on the downlink data, which is received in the subframe #0 of the SCell, in the subframe #7 of the PCell.

That is, in the transmission and reception method according to Embodiment 3, terminal 200 always reports the result of error detection on the downlink data, which is received in the SCell, in the PUCCH region or the PUSCH region of the PCell regardless of the presence or absence of the PUSCH region of the SCell. In this manner, base station 100 can check whether the result of error detection on the downlink data received in the SCell is reported in the PUCCH region of PCell or reported in the PUSCH region of the PCell. In other words, base station 100 does not need to check how the result of error detection is received over a plurality of component carriers and a plurality of timings. Therefore, in the transmission and reception method according to Embodiment 3, the reporting timing of the error detection result of the SCell is different between the case of 2CC-same Config setting and the case of 2CC-different Config setting, but base station 100 can easily perform the error detection result decoding processing.

In addition, the transmission and reception method of Embodiment 3 is not intended to be applicable only to the configuration of Embodiment 1 or Embodiment 2. That is, the transmission and reception method of Embodiment 3 is not limited to being applied to the configuration in which the reporting timing of the result of error detection on the downlink data of the SCell is different between the case of 2CC-same Config setting and the case of 2CC-different Config setting. Here, the transmission and reception method of Embodiment 3 refers to a method in which terminal 200 reports the error detection result of the SCell in the PCell even if the UL grant is indicated in the SCell and the uplink data is transmitted in the PUSCH region of the SCell.

Figure 7A:
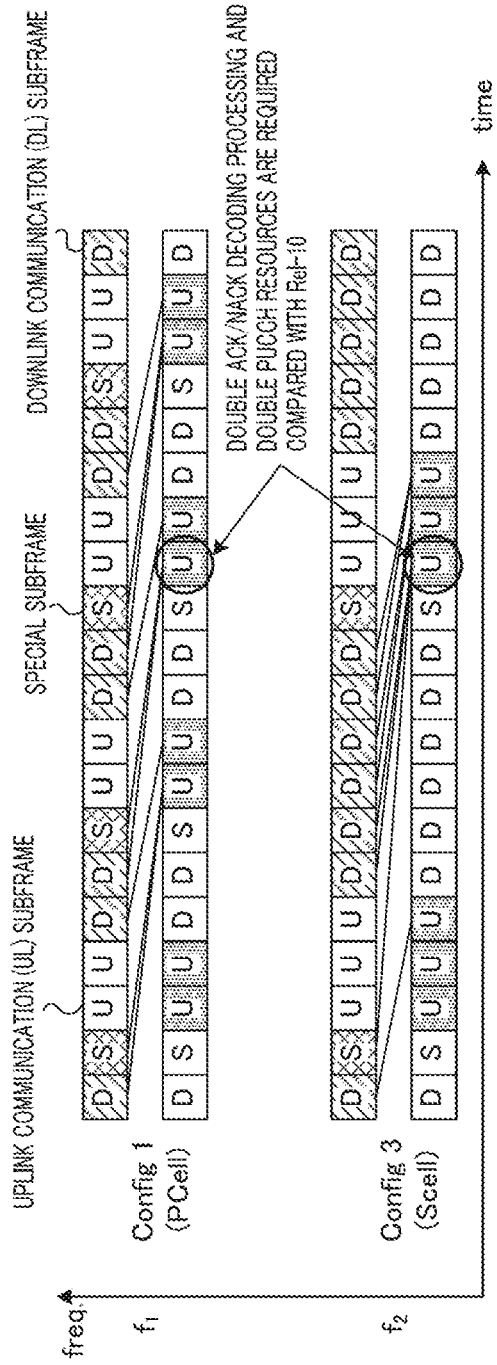
FIGS. 7A and 7B are diagrams showing a method of reporting response signals when different UL-DL Configurations are set for component carriers.
Figure 7B:
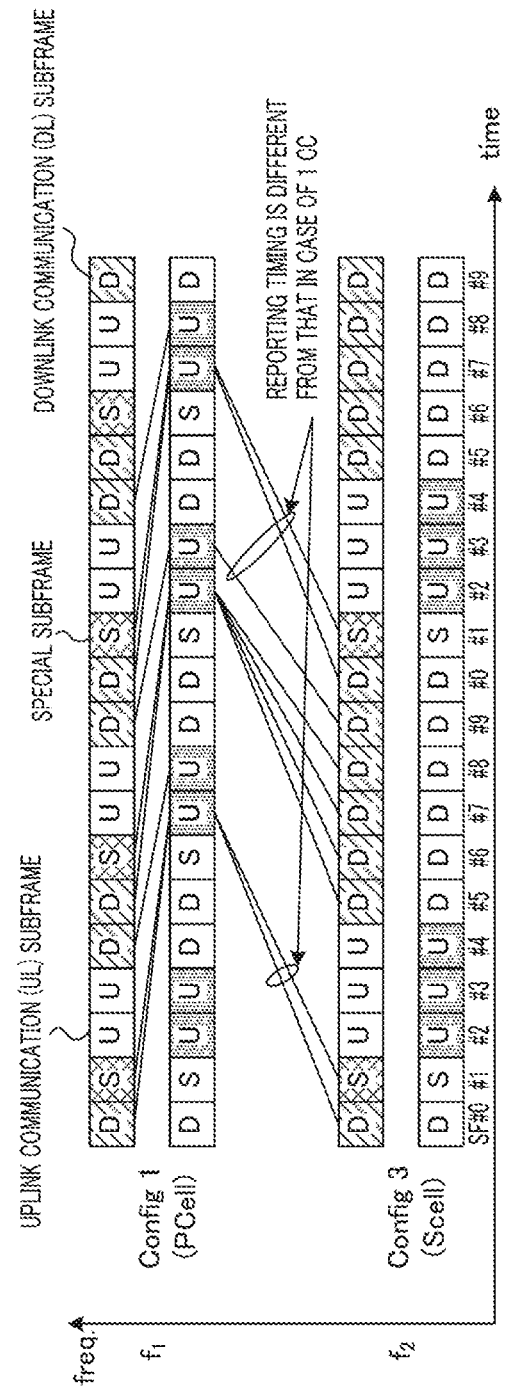

The transmission and reception method of Embodiment 3 can also be similarly applied to the configuration in which terminal 200 reports the error detection result of the SCell in the UL subframe of the earliest PCell, in which reporting can be performed, in the case of 2CC-different Config setting, for example, as shown in FIG. 7B. For example, in the case of 2CC-same Config setting, terminal 200 reports the error detection result in the subframe #4 of the next frame for the downlink data received in the subframe #9 of the SCell for which Config 3 (refer to FIG. 3) is set. In contrast, as shown in FIG. 7B, when reporting the result of error detection on the downlink data received in the SCell at the earliest timing of the PCell, terminal 200 reports the result of error detection on the downlink data in the subframe #3 of the next frame. Application of the method of Embodiment 3 to FIG. 7B is as follows. That is, in FIG. 7B, even if PUSCH transmission is performed in the subframe #4 of the next frame of the SCell, terminal 200 reports the result of error detection on the downlink data, which is received in the subframe #9 of the SCell, in the subframe #3 of the next frame of the PCell. Therefore, since base station 100 does not need to determine the error detection result over a plurality of component carriers and a plurality of timings, base station 100 can easily perform the error detection result decoding processing.

In addition, the transmission and reception method of Embodiment 3 is not intended to be applicable only to the configurations shown in FIGS. 7B and 8A to 8D, the configuration of Embodiment 1 shown in FIGS. 14A to 14G, and the configuration of Embodiment 2. The method of Embodiment 3 can be applied to any configuration in which the reporting timing of the result of error detection on the downlink data of the SCell is different between the case of 2CC-different Config setting and the case of 2CC-same Config setting. In addition, the same effect is obtained in this manner.

Embodiment 4

A transmission and reception method according to Embodiment 4 is for reducing the delay of an error detection result by adding a restriction to a subframe, in which base station 100 reports DL assignment to terminal 200, in addition to the processing performed in the methods of Embodiments 1 and 2.

Figure 19:
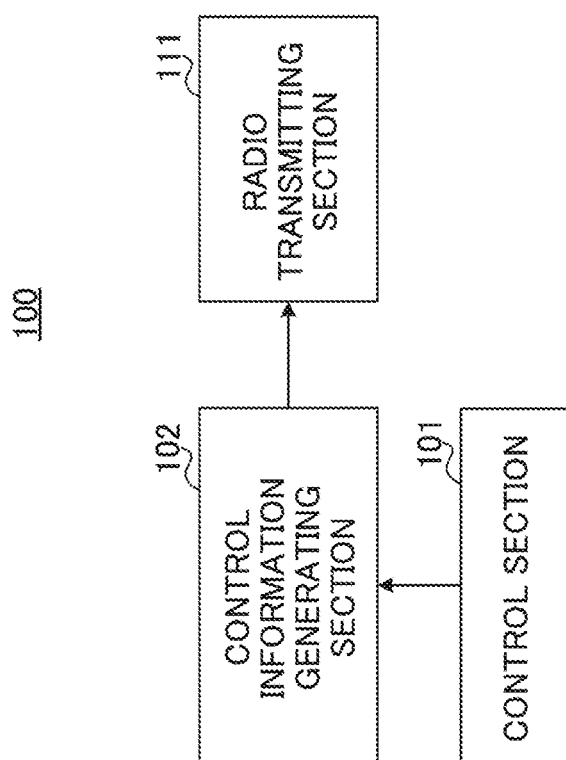
FIG. 19 is a block diagram showing the main configuration of a base station according to Embodiment 4 of the present disclosure.

FIG. 19 is a main block diagram of base station 100 according to Embodiment 4. Base station 100 includes control section 101 that determines the assignment of resources of downlink data to terminal 200, control information generating section 102 that generates control information including DL assignment on the basis of the determination of control section 101, radio transmitting section 111 that transmits the downlink data and the control information to terminal 200, and the like.

FIGS. 20A and 20B are diagrams illustrating the delay of an error detection result according to the embodiment of the present disclosure. In the methods of Embodiments 1 and 2, the reporting timing of the result of error detection on the downlink data of the SCell is shifted to be different from the reporting timing in the case of 1CC-SCell Config setting. For this reason, the delay of the error detection result may be larger than that in the case of 1CC-SCell Config setting. The reporting timing delay (delay from the reporting timing in the case of 1CC-SCell Config setting) is up to 4 ms when the UL-DL Configuration of 5 ms period is set for the PCell. That is, as shown in FIGS. 20A and 20B, terminal 200 reports the error detection result, which is reported in the subframe #3 in the 1CC-SCell Config setting, in the subframe #7. In addition, when the UL-DL Configuration of 10 ms period is set for the PCell, the delay of the error detection result is up to 9 ms. That is, terminal 200 reports the error detection result, which is reported in the subframe #3 in the 1CC-SCell Config setting, in the subframe #2 of the next frame.

In Embodiment 4, base station 100 defines the delay of the reporting timing of the error detection result (delay from the reporting timing in 1CC-SCell Config setting) within the maximum value (for example, 4 ms). In addition, base station 100 restricts a subframe to transmit downlink data to terminal 200, that is, a subframe to report DL assignment, so that the reporting of the error detection result exceeding the maximum value does not occur. Specifically, base station 100 prohibits the reporting of DL assignment for a subframe in which the error detection result exceeds the maximum value when transmitting the downlink data. Thus, base station 100 can restrict the delay of the error detection result within the maximum value.

In addition, when the UL-DL Configuration of 10 ms period is set for the PCell, the delay amount of error detection result becomes larger. Therefore, base station 100 or terminal 200 may restrict the UL-DL Configuration, which can be set for the PCell, only to the UL-DL Configuration of 5 ms period (Config 0, Config 1, Config 2, and Config 6). Also in this method, terminal 200 can restrict the delay of the reporting timing of the error detection result to the above-described maximum value (4 ms) or less.

However, when restricting the setting of the UL-DL Configuration of 10 ms period for the PCell, base station 100 may affect other terminals within the PCell. That is, when a terminal, which does not support setting of different UL-DL Configurations for a plurality of component carriers, is present in the PCell, the terminal cannot communicate in the UL-DL Configuration of 10 ms period if the UL-DL Configuration of the PCell is restricted. On the other hand, the effect that other terminals in the PCell are not affected is achieved by adopting the configuration in which base station 100 restricts a subframe to indicate DL assignment as in Embodiment 4.

In addition, in Embodiments 1 to 4, the cases where different UL-DL Configurations are set for a plurality of component carriers in the TDD system have been illustrated. However, the present disclosure is not limited to these cases. For example, the present disclosure can also be similarly applied to a case where a TDD carrier is set for the PCell and at least downlink TDD carrier is set for the SCell.

The functional blocks described in the embodiments of the present disclosure are achieved by an LSI (Large Scale Integration), which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI. In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used. Should a circuit integration technology replacing LSI appear as a result of advancements in semiconductor technology or other technologies derived from the technology, the functional blocks could be integrated using such a technology. Another possibility is the application of biotechnology and/or the like. In addition, the functional blocks used in the description of the embodiments can be implemented by software that functions by a program executed by a computer, or can be implemented by cooperation of software and hardware.

The disclosure of Japanese Patent Application No. 2011-174888, filed on Aug. 10, 2011, including the specification, drawings and abstract, is incorporated herein by reference in its entirety.

INDUSTRIAL APPLICABILITY

The present disclosure is useful in a mobile communication system, for example.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time-multiplexing section
221 Selection section

The invention claimed is:

1. An integrated circuit comprising:
an input, which, in operation, receives downlink data on a first component carrier and a second component carrier, wherein the first component carrier and the second component carrier respectively have frame configuration patterns among a plurality of frame configuration patterns, each frame configuration pattern defining transmission timings of one or more special subframes, one or more uplink subframes, and one or more downlink subframes within a frame, the special subframe being a subframe for switching from downlink transmission to uplink transmission;
circuitry which is coupled to the input and which, in operation, performs error detection of the downlink data received on each of the first component carrier and the second component carrier, and generates a response signal indicating error detection results for the first component carrier and the second component carrier; and
an output, which is coupled to the circuitry and which, in operation, transmits the response signal for the first component carrier and the second component carrier using a set of one or more uplink subframes, which is located immediately after the one or more special subframes, within a frame only on the first component carrier, irrespective of the frame configuration pattern configured on the second component carrier.

2. The integrated circuit according to claim 1, wherein the plurality of frame configuration patterns include one frame configuration pattern whose periodicity of a DL-UL switching point is 5 milliseconds (ms) and another frame configuration pattern whose periodicity of the DL-UL switching point is 10 ms;
if the periodicity of the DL-UL switching point in a first frame configuration pattern for the first component carrier is 5 ms, a number of the uplink subframe(s) included in the set is two; and
if the periodicity of the DL-UL switching point in the first frame configuration pattern for the first component carrier is 10 ms, the number of the uplink subframe(s) included in the set is one.

3. The integrated circuit according to claim 2, wherein one frame includes ten subframes with indexes #0, #1, #2, #3, #4, #5, #6, #7, #8, #9; and if the periodicity of the DL-UL switching point in the first frame configuration pattern is 5 ms, the uplink subframe(s) in the set are a subframe #2 and a subframe #7; and if the periodicity of the DL-UL switching point in the first frame configuration pattern is 10 ms, the uplink subframe in the set is a subframe #2.

4. The integrated circuit according to claim 1, wherein each of the plurality of frame configuration patterns further defines a transmission timing of the one or more special subframes including a guard period for switching from a downlink subframe to a uplink subframe; and a periodicity of a DL-UL switching point equals a periodicity of the one or more special subframes.

5. The integrated circuit according to claim 4, wherein the one or more uplink subframes in the set is located next to the one or more special subframes in a time domain.

6. The integrated circuit according to claim 1, wherein a ratio of the uplink subframe(s) and the downlink subframe(s) included in a single frame according to a first frame configuration pattern for the first component carrier is different from a ratio of the uplink subframe(s) and the downlink subframe(s) included in the single frame according to a second frame configuration pattern for the second component carrier.

7. The integrated circuit according to claim 1, wherein the one or more uplink subframes in the set is located at an earliest transmission timing which is more than four subframes after a corresponding downlink subframe.

8. An integrated circuit comprising:

reception circuitry, which, in operation, receives downlink data on a first component carrier and a second component carrier, wherein the first component carrier and the second component carrier respectively have frame configuration patterns among a plurality of frame configuration patterns, each frame configuration pattern defining transmission timings of one or more special subframes, one or more uplink subframes, and one or more downlink subframes within a frame, the special subframe being a subframe for switching from downlink transmission to uplink transmission;

response signal generation circuitry, which is coupled to the reception circuitry and which, in operation, performs error detection of the downlink data received on each of the first component carrier and the second component carrier, and generates a response signal indicating error detection results for the first component carrier and the second component carrier; and transmission circuitry, which is coupled to the response signal generation circuitry and which, in operation, transmits the response signal for the first component carrier and the second component carrier using a set of one or more uplink subframes, which is located immediately after the one or more special subframes, within a frame only on the first component carrier, irrespective of the frame configuration pattern configured on the second component carrier.

9. The integrated circuit according to claim 8, wherein the plurality of frame configuration patterns include one frame configuration pattern whose periodicity of a DL-UL switching point is 5 milliseconds (ms) and another frame configuration pattern whose periodicity of the DL-UL switching point is 10 ms;

if the periodicity of the DL-UL switching point in a first frame configuration pattern for the first component carrier is 5 ms, a number of the uplink subframe(s) included in the set is two; and if the periodicity of the DL-UL switching point in the first frame configuration pattern for the first component carrier is 10 ms, the number of the uplink subframe(s) included in the set is one.

10. The integrated circuit according to claim 9, wherein one frame includes ten subframes with indexes #0, #1, #2, #3, #4, #5, #6, #7, #8, #9; and if the periodicity of the DL-UL switching point in the first frame configuration pattern is 5 ms, the uplink subframe(s) in the set are a subframe #2 and a subframe #7; and if the periodicity of the DL-UL switching point in the first frame configuration pattern is 10 ms, the uplink subframe in the set is a subframe #2.

11. The integrated circuit according to claim 8, wherein each of the plurality of frame configuration patterns further defines a transmission timing of the one or more special subframes including a guard period for switching from a downlink subframe to a uplink subframe; and a periodicity of a DL-UL switching point equals a periodicity of the one or more special subframes.

12. The integrated circuit according to claim 11, wherein the one or more uplink subframes in the set is located next to the one or more special subframes in a time domain.

13. The integrated circuit according to claim 8, wherein a ratio of the uplink subframe(s) and the downlink subframe(s) included in a single frame according to a first frame configuration pattern for the first component carrier is different from a ratio of the uplink subframe(s) and the downlink subframe(s) included in the single frame according to a second frame configuration pattern for the second component carrier.

14. The integrated circuit according to claim 8, wherein the one or more uplink subframes in the set is located at an earliest transmission timing which is more than four subframes after a corresponding downlink subframe.

* * * * *